US010802956B2

(12) United States Patent
Temam et al.

(10) Patent No.: US 10,802,956 B2
(45) Date of Patent: *Oct. 13, 2020

(54) ACCESSING PROLOGUE AND EPILOGUE DATA

(71) Applicant: Google LLC, Mountain View, CA (US)

(72) Inventors: Olivier Temam, Paris (FR); Harshit Khaitan, San Jose, CA (US); Ravi Narayanaswami, San Jose, CA (US); Dong Hyuk Woo, San Jose, CA (US)

(73) Assignee: Google LLC, Mountain View, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 16/112,307

(22) Filed: Aug. 24, 2018

(65) Prior Publication Data

US 2019/0034327 A1  Jan. 31, 2019

Related U.S. Application Data

(63) Continuation of application No. 15/664,842, filed on Jul. 31, 2017, now Pat. No. 10,108,538.

(51) Int. Cl.
*G06N 5/00* (2006.01)
*G06F 12/02* (2006.01)
(Continued)

(52) U.S. Cl.
CPC ...... *G06F 12/0207* (2013.01); *G06F 9/30043* (2013.01); *G06F 9/345* (2013.01);
(Continued)

(58) Field of Classification Search
CPC .............................. G06N 99/005; G06N 5/02
See application file for complete search history.

(56) References Cited

U.S. PATENT DOCUMENTS 5,920,724 A   7/1999  Chang
5,958,048 A   9/1999  Babaian et al.
(Continued)

FOREIGN PATENT DOCUMENTS

EP    3226121       10/2017
TW    200839517    10/2008
(Continued)

OTHER PUBLICATIONS

TW Office Action and Search Report issued in Taiwanese Application No. 107126266, dated Feb. 26, 2019, 17 pages (with English translation).

(Continued)

*Primary Examiner* — Charles Rones
*Assistant Examiner* — Tian-Pong Chang
(74) *Attorney, Agent, or Firm* — Fish & Richardson P.C.

(57) ABSTRACT

Methods, systems, and apparatus, including an apparatus for accessing data. In some implementations, an apparatus includes address offset value elements that are each configured to store an address offset value. For each address offset value element, the apparatus can include address computation elements that each store a value used to determine the address offset value. One or more processors are configured to receive a program for performing computations using tensor elements of a tensor. The processor(s) can identify, in the program, a prologue or epilogue loop having a corresponding data array for storing values of the prologue or epilogue loop and populate, for a first address offset value element that corresponds to the prologue or epilogue loop, the address computation elements for the first address offset value element with respective values based at least on a number of iterations of the prologue or epilogue loop.

20 Claims, 12 Drawing Sheets

(51) Int. Cl.
  *G06F 12/1009* (2016.01)
  *G06N 5/02* (2006.01)
  *G06N 20/00* (2019.01)
  *G06F 9/345* (2018.01)
  *G06F 9/30* (2018.01)

(52) U.S. Cl.
  CPC ........ *G06F 9/3455* (2013.01); *G06F 12/1009* (2013.01); *G06N 5/02* (2013.01); *G06N 20/00* (2019.01); *G06F 2212/656* (2013.01)

(56) References Cited

U.S. PATENT DOCUMENTS

| | | | |
|---|---|---|---|
| 6,429,876 B1* | 8/2002 | Morein | G06T 9/00 345/531 |
| 8,285,658 B1 | 10/2012 | Kellas-Dicks | |
| 8,713,549 B2 | 4/2014 | Nuzman et al. | |
| 9,946,539 B1* | 4/2018 | Temam | G06N 3/0454 |
| 2004/0034754 A1* | 2/2004 | Schreiber | 711/165 |
| 2010/0145992 A1 | 6/2010 | Rakib et al. | |
| 2010/0153100 A1* | 6/2010 | Kyung Jin | G10L 19/107 704/219 |
| 2011/0029962 A1* | 2/2011 | Nuzman | G06F 8/452 717/160 |
| 2012/0216011 A1* | 8/2012 | Gove | G06F 15/8053 712/7 |
| 2013/0185538 A1 | 7/2013 | Hung et al. | |
| 2014/0188961 A1 | 7/2014 | Plotnikov et al. | |
| 2016/0085530 A1 | 3/2016 | Gonzalez | |
| 2016/0321542 A1 | 11/2016 | Towal | |
| 2017/0075691 A1 | 3/2017 | Plotnikov et al. | |
| 2017/0200094 A1* | 7/2017 | Bruestle | G06N 20/00 |
| 2017/0270427 A1* | 9/2017 | Zhou | G06N 20/00 |

FOREIGN PATENT DOCUMENTS

| | | |
|---|---|---|
| TW | 201401047 | 1/2014 |
| TW | 201508652 | 3/2015 |
| TW | 201541374 | 11/2015 |
| WO | WO 2018/217258 | 11/2018 |

OTHER PUBLICATIONS

PCT International Preliminary Report in Patentability in International Application No. PCT/US2018/041361, dated Feb. 13, 2020, 7 pages.
PCT International Search Report and Written Opinion issued in International Application No. PCT/US2018/041361, dated Oct. 23, 2018, 12 pages.
GB Search and Examination Report issued in British Application No. GB1812135.0, dated Jan. 28, 2019, 6 pages.
EP Office Action in European Application No. 18746463.1, dated May 11, 2020, 4 pages.
TW Office Action in Taiwan Application No. 108127135, dated Jun. 29, 2020, pages (with English translation).

* cited by examiner

ACCESSING PROLOGUE AND EPILOGUE DATA

CROSS-REFERENCE TO RELATED APPLICATIONS

This application is a continuation application of, and claims priority to, U.S. patent application Ser. No. 15/664,842, titled "ACCESSING PROLOGUE AND EPILOGUE DATA," filed on Jul. 31, 2017. The disclosure of the foregoing application is incorporated herein by reference in its entirety for all purposes.

BACKGROUND

This specification generally relates to accessing data for performing machine learning computations using a special purpose computational unit.

Neural networks are machine learning models that employ one or more layers of models to generate an output, e.g., a classification, for a received input. Some neural networks include one or more hidden layers in addition to an outer layer. The output of each hidden layer is used as input to the next layer in the network, i.e., the next hidden layer or the output layer of the network. Each of the layers generates an output from a received input in accordance with current values of a respective set of parameters.

Some neural networks include one or more convolutional neural network layers. Each convolutional neural network layer has an associated set of kernels. Kernels can be represented as a matrix structure of weight inputs. Each convolutional layer uses the kernels to process inputs to the layer. A set of inputs to the layer can also be represented as a matrix structure.

SUMMARY

This specification describes technologies relating to determining memory addresses for prologue and/or epilogue data and accessing the data for use in machine learning computations using a special purpose computational unit.

In general, one innovative aspect of the subject matter described in this specification can be embodied in an apparatus for accessing data. The apparatus can include address offset value elements that are each configured to store an address offset value. For each address value element, the apparatus can include address computation elements that each store a value used to determine the address offset value stored in the address offset value element. The apparatus can include one or more processors configured to receive a program for performing computations using tensor elements of an N-dimensional tensor. The processor(s) can be configured to identify, in the program, a prologue or epilogue loop having a corresponding data array for storing values of the prologue or epilogue loop.

The processor(s) can be configured to populate, for a first address offset value element that corresponds to the prologue or epilogue loop, the address computation elements for the first address offset value element with respective values based at least on a number of iterations of the prologue or epilogue loop. The processor(s) can be configured to populate, for a second address offset value element for each dimension of the N-dimensional tensor, the address computation elements for the second address offset value element with respective values based at least on a number of iterations of a loop in the program that corresponds to the dimension. The processor(s) can be configured to determine, for each data element of each data array, a memory address for the data array using a current value of the first address offset value for the data array at a time at which the memory address for the data element is determined. The first address offset value for the data array is adjusted after each determination of a memory address for a data element of the data array.

The processor(s) can be configured to determine, for each tensor element of the N-dimensional tensor, a memory address for the tensor element using a current value of each second address offset value at a time at which the memory address for the tensor element is determined. One or more of the second address offset values are adjusted after each determination of a memory address for a tensor element of the N-dimensional tensor. The processor(s) can be configured to output data indicating the determined address for each tensor element and each data element.

These and other implementations can each optionally include one or more of the following features. In some aspects, the apparatus can include a processing unit configured to access each tensor element and each data element based on each determined address. The one or more data arrays can include a prologue data array that includes data elements. Each data element can store a bias value for a machine learning computation.

In some aspects, the one or more processors can determine the memory address for each tensor element in a first sequence and the one or more processors determine the memory address for each data element in a second sequence either before or after the first sequence. Determining the address of a particular tensor element can include determining a sum of the address offset values for each dimension using one or more hardware adders. In some aspects, determining the address of a particular data element can include determining a sum of the address offset value for the particular data element and a base address for the data element.

In some aspects, the address computation elements include a first initial value element that stores a first initial value for the prologue or epilogue loop, a first step value element that stores the first step value for the prologue or epilogue loop, and for each dimension of the N-dimensional tensor: a second initial value element that stores a second initial value for the dimension and a second step value element that stores a second step value for the dimension.

In some aspects, each address offset value element, each initial value element, and each step value element is a register. In some aspects, the one or more processors initialize each first initial value, each first step value, each second initial value, and each second step value based on a single instruction that specifies a loop for each data array and a nested loop for the N-dimensional tensor.

In some aspects, the one or more processors are configured to determine, for each dimension, the address offset value for the dimension after each iteration of a nested loop for the dimension by adding the step value to a previous address offset value for the dimension.

In some aspects, the apparatus includes, for each dimension, a limit value element that stores a limit value for the dimension. The one or more processors can be further configured to determine, for each dimension, whether the determined address offset value for the dimension equals the limit value for the dimension. In response to determining that the determined address offset value for a first dimension that corresponds to a first nested loop equals the limit value for the first dimension, the one or more processor(s) can reset the address offset value for the first dimension to the initial value for the first dimension and update, for a second dimension that corresponds to a second nested loop in which the first nested loop is nested and using the one or more hardware adders, the address offset value for the second dimension to equal a sum of the step value for the second dimension and the address offset value for the second dimension.

The subject matter described in this specification can be implemented in particular embodiments so as to realize one or more of the following advantages. Using registers to keep track of memory address values allows a program to iterate deeply-nested loops and access prologue and/or epilogue data with one instruction. Memory address values can be quickly determined by applying simple additions based on the values stored in the registers. A special purpose computational unit can include adders that calculate the addresses. By using adders rather than arithmetic logic units (ALUs), multipliers, or other complex circuitry, the size of the circuit and fabrication costs of the circuit can be reduced. Determining memory address values using hardware adders allows the number of computational cycles at the processor to be reduced, and increases processor bandwidth for other computation tasks. A two-dimensional register architecture allows multi-dimensional tensors each having different dimensions and prologue/epilogue data arrays to be tracked concurrently. A single hardware encoded instruction can be used to determine memory addresses for, and access data of, prologue and/or epilogue data elements and tensor elements. The use of a single instruction results in denser encoding, fewer memory resources used, and/or fewer required memory resources.

Other implementations of this and other aspects include corresponding systems, methods, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
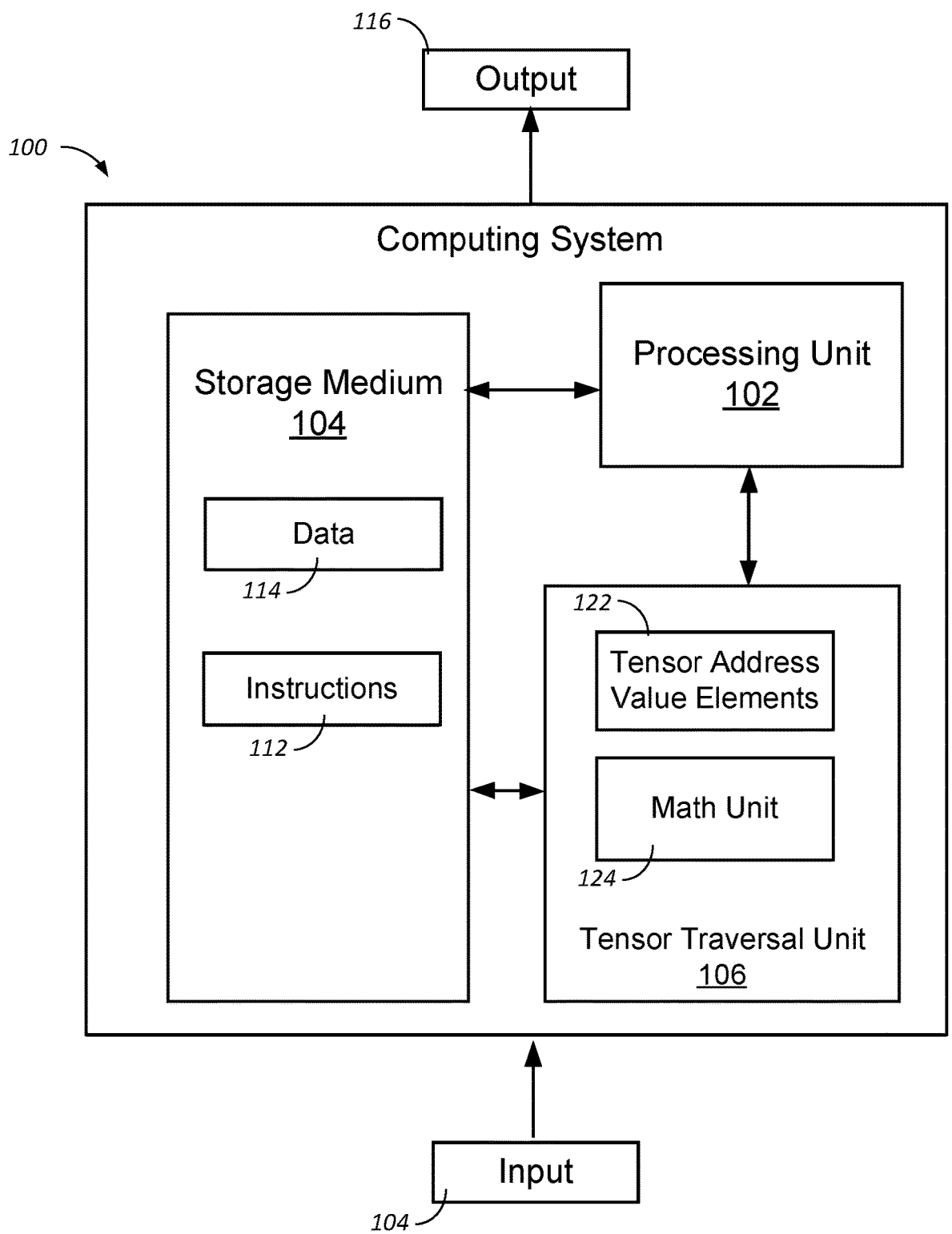
FIG. 1 is a block diagram of an example computation system.

In general, when a software algorithm processes an N-dimensional tensor, a nested loop may be used. Each loop can be responsible for traversing a respective dimension of the N-dimensional tensor. A multi-dimensional tensor may be a matrix or a multi-dimensional matrix. For example, a 2-dimensional tensor is a matrix, while a 3-dimensional tensor is a three-dimensional matrix made up of multiple two-dimensional matrices. Each dimension of the N-dimensional tensor may include one or more elements, where each element may store a respective data value. For example, a tensor may be a variable in a program, where the variable may have three dimensions. The first dimension may have a length of three hundred elements, the second dimension may have a length of a thousand elements, and the third dimension may have a length of twenty elements. Of course, other numbers of elements in each dimension are possible.

Traversing the tensor in a nested loop can include a computation of a memory address value of a tensor element to load or store the corresponding data value of the tensor element. A for-loop is an example of a nested loop, where three loops tracked by three loop index variables (e.g., i, j, and k) can be nested to traverse through a three-dimensional tensor. In a neural network, a value of an element may be used in one or more dot product computations associated with the tensor. For example, the value of the tensor element may be multiplied with a corresponding parameter or weight. The tensor elements of the tensor may be traversed in order based on nested for-loops to access the element and perform one or more computations using the value of the element. Continuing the three dimensional tensor example, an outer for-loop may be used to traverse the loop tracked by variable i, a middle for-loop loop may be used to traverse the loop tracked by variable j, and an inner for-loop may be used to traverse the loop tracked by variable k. In this example, the first element accessed may be (i=0, j=0, k=0), the second element may be (i=0, j=0, k=1), and so on. As described below, a tensor traversal unit can determine the memory address for each element based on an instruction that specifies the nested loop so that a processing unit can access the value of the element and perform the one or more computations using the value of the element. The values of weights or parameters can also be accessed similarly using one or more for-loops, e.g., a loop nest that includes multiple nested for-loops. The tensor traversal unit can also determine the memory addresses for weights or parameters used in the computations and/or for the outputs of the computations, which may be used as inputs to a hidden layer of the neural network.

A prologue is one or more loops that are performed prior to a main function or main loop nest. For example, a prologue may be used to perform a function (e.g., load or compute bias values) prior to performing a computation using the values of tensor elements. A prologue can include one or more loops that are executed prior to the execution of nested loops for the tensor. For example, a prologue may be used to determine bias values or weights for a neural network computation. Similarly, an epilogue is one or more loops that are performed after a main function or main loop nest. For example, an epilogue may be used to perform a function after performing a computation using the values of the tensor elements. The tensor traversal unit described herein can determine memory addresses for accessing data elements of one or more prologue and/or epilogue data arrays using a same instruction used to determine memory addresses for accessing tensor elements of a tensor.

For example, an instruction can specify a for-loop for determining memory addresses for prologue data elements and nested loops for determining memory addresses for tensor elements. In another example, an instruction can specify a for-loop for determining memory addresses for epilogue data elements and nested loops for determining memory addresses for tensor elements. In yet another example, an instruction can specify a for-loop for determining memory addresses for prologue data elements, nested for-loops for determining memory addresses for tensor elements, and a for-loop for determining memory addresses for epilogue data elements. As described below, the tensor traversal unit can convert the instruction into a set of values used to iteratively determine the memory addresses for each data element based on the loops specified by the instruction.

The tensor traversal unit can determine the memory addresses in a sequence, e.g., one at a time, and output the memory addresses for use by a processing unit. The processing unit can use the memory addresses to access the data elements and the tensor elements, e.g., to perform neural network computations using the values of the elements.

FIG. 1 shows a block diagram of an example computing system 100 for traversing a tensor. In general, the computing system 100 processes an input 104 to generate an output 116. The computing system 100 may be configured to perform linear algebra computations, e.g., machine learning computations. The input 104 may be any suitable data that can be processed by the computing system 100. The computing system 100 includes a processing unit 102, a storage medium 104, and a tensor traversal unit 106.

In general, when the processing unit 102 executes an instruction for accessing a particular element of a tensor, the processing unit 102 may access the storage medium 104 to read data 114 representing the value of the particular element. The processing unit 102 may use a memory address determined by the tensor traversal unit 106 to access the storage medium 104 to read that data 114 representing the value of the particular data element. For example, a program may include a nested loop and the processing unit 102 may execute an instruction to access an element of a two-dimensional array variable within the nested loop according to current index variable values associated with the nested loop. The tensor traversal unit 106 can determine, for each element of the two-dimensional array, an address offset value that represents an offset from a memory address for the element based on a current value of the index variable values when the memory address is determined. In another example, the tensor traversal unit 106 can determine the address offset values prior to execution of the program and the processing unit 102 can access the determined offset values from the storage medium. The processing unit 102 may then access, using the address offset value and from the storage medium 104, the particular element of the two-dimensional array variable.

The processing unit 102 is configured to process instructions for execution within the computing system 100, including instructions 112 stored in the storage medium 104 or other instructions stored in another storage device. The processing unit 102 may include one or more processors. The storage medium 104 stores information within the computing system 100. In some implementations, the storage medium 104 is a volatile memory unit or units. In some other implementations, the storage medium 104 is a non-volatile memory unit or units. The storage medium 104 may also be another form of computer-readable medium, such as a floppy disk device, a hard disk device, an optical disk device, or a tape device, a flash memory or other similar solid state memory device, or an array of devices, including devices in a storage area network or other configurations. The instructions, when executed by the processing unit 102, cause the processing unit 102 to perform one or more tasks.

The tensor traversal unit 106 may be implemented as an application-specific integrated circuit. The tensor traversal unit 106 may be configured to determine memory address values associated with one or more tensors and one or more data arrays of a prologue and/or epilogue. The values may include initial values, step values, end values, address offset values, memory address offset values based on the address offset values, and/or memory address values based on the memory address offset values and a base address.

The tensor traversal unit 106 translates tensor indices into memory addresses. For example, the tensor traversal unit 106 may translate a set of N-dimensional tensor indices into a one-dimensional address space. The tensor traversal unit 106 can perform such translations by making a tensor element's memory address a combination (e.g., a linear combination) of the element's dimension indices.

The tensor traversal unit 106 can efficiently and programmatically generate a sequence of memory addresses which reference a sequence of tensor elements. The address sequence corresponds to the sequence of tensor elements that would be accessed by a loop nest in a software traversal routine. The sequence of elements accessed during the traversal may or may not be physically contiguous in memory.

Similarly, the tensor traversal unit 106 can efficiently and programmatically generate a sequence of memory addresses which reference a sequence of data elements for a prologue and/or a sequence of data elements for an epilogue. For example, a program may include a prologue loop that is executed prior to the loop nest and/or an epilogue loop that is executed after the loop nest. The address sequence for a prologue or epilogue may correspond to the sequence of data elements that would be accessed by the prologue or epilogue loop in a software traversal routine.

The tensor traversal unit 106 includes tensor address value elements 122 and a math unit 124. Each of the tensor address value elements 122 may be a storage element, for example a register or other suitable storage circuitry. In some implementations, the tensor address value elements 122 may be physically or logically arranged into different groups, as described in more detail below with reference to FIGS. 2A-2J. In some implementations, a group of the tensor address value elements 122 may be physically or logically arranged into a multi-dimensional array. For example, each group of the tensor address value elements 122 may be physically or logically arranged into a two-dimensional array.

The tensor traversal unit 106 can receive an instruction that specifies a loop nest that includes nested loops for traversing an N-dimensional tensor. The instruction may also specify a loop for traversing a prologue data array and/or a loop for traversing an epilogue data array. For example, a program executed by the processing unit 102 may perform machine learning computations based on values of tensor elements of the tensor. In addition, the program may perform functions prior to the computations using one or more prologues and/or functions after the computations using one or more epilogues.

The tensor traversal unit 106 can translate the instruction into initial values, step values, and end values for each dimension of the tensor and for each data array of the prologue(s) and/or epilogues. The initial value for each dimension or array may be based on (e.g., equal to) a start value for a loop used to traverse the dimension or array. For example, if loop i is in the form "for i=0; i<3", the initial value may be zero for a dimension that corresponds to loop i. In some implementations, the initial value may be based on a desired address offset from a base address for the tensor, prologue, or epilogue. The tensor traversal unit 106 can determine the initial value, step values and/or end values such that each tensor element and each data element are assigned a unique memory address (or a unique memory address value that is combined with a base address to determine the unique memory address. For example, the tensor traversal unit 106 can determine the step values and the end values for each dimension of the tensor and each data array for the prologues and/or epilogues based on the number of elements included in each dimension and array. The tensor traversal unit 106 can store the determine values in respective elements and use the values to determine memory addresses, as described below.

The tensor traversal unit 106 can determine the memory addresses for the tensor elements and the prologue and/or epilogue data arrays in a sequence, e.g., one at a time. In some implementations, the processing unit 102 includes a finite-state machine (FSM) that instructs the tensor traversal unit 106 to determine memory addresses and/or when to pause the determination process. The FSM can also be a stand-alone device of the computing system 100. While active, the tensor traversal unit 106 can determine the memory addresses for the tensor elements and data elements in a sequence until all of the memory addresses have been determined. When a memory address has been determined for each tensor element and each data element, the tensor traversal unit 106 can stop. In some implementations, the tensor traversal unit 106 can determine a memory address for a particular tensor element or a particular data element one by one in response to a respective instruction received for the particular tensor element or the particular data element.

In some implementations, the tensor traversal unit 106 determines a memory address offset value for each tensor element and/or each data element of a prologue data array and/or an epilogue data array. In this example, the processing unit 102 can access the tensor element or data element based on the memory address offset value and a base address for the elements. In another example, the tensor traversal unit 106 determines the memory addresses for each tensor element and each data element by determining a respective memory address offset value for each element and adding the memory address offset value to the base address.

The hardware adder unit 124 can include one or more arithmetic logic units (ALUs), one or more hardware multipliers, and/or one or more hardware adders. Each adder may include digital circuitry that is configured to perform addition operations. As described below, the math unit may add partial address offset values to determine a total address offset value for an element of a tensor. As hardware adders require fewer circuit components than arithmetic logic units (ALUs) and hardware multipliers, the size of the circuitry of the hardware adder unit 124 (and thus the size of the tensor traversal unit 106) can be smaller than a tensor traversal unit that includes ALUs and/or multipliers. In addition, the cost of fabricating a tensor traversal unit with hardware adders may be less than the cost of fabricating a tensor traversal unit with ALUs and/or multipliers. In some implementations, the hardware adder unit 124 includes only adders and no other mathematical or logic circuitry.

Figure 2A:
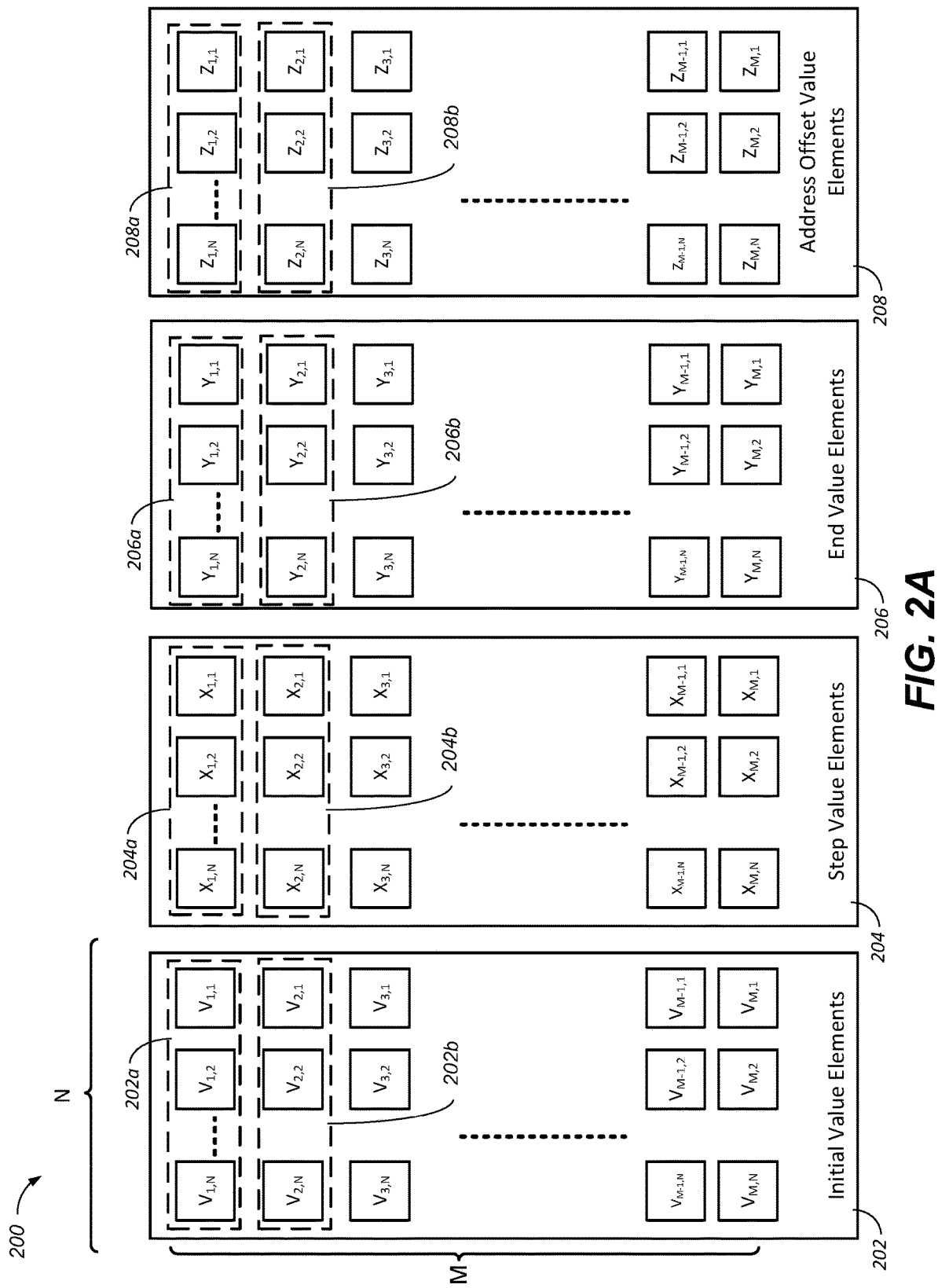
FIGS. 2A-2J illustrate an example tensor traversal unit.

FIG. 2A shows an example set of tensor address value elements 200 of a tensor traversal unit. The tensor address value elements 200 may correspond to the tensor address value elements 122 of the tensor traversal unit 106. The tensor traversal unit 200 includes a group of initial value elements 202, a group of step value elements 204, a group of end value elements 206, and a group of address offset value elements 208.

The initial value elements 202 may be physically or logically arranged as a 2-D array having M rows and N columns, where M and N are integers greater than or equal to one. The initial value elements 202 may store initial values of address offsets used to determine a memory address for a tensor element, a prologue data element, or an epilogue data element. In some implementations, each row of the initial value elements 202 may represent initial values for a tensor, prologue, or epilogue. For example, if a program defines two array variables V1 and V2, the tensor traversal unit may assign rows 202a and 202b to store the initial values for array variables V1 and V2, respectively. In this example, variable V1 may be bias variables for a prologue and variable V2 may be tensor variables.

In some implementations, each column of the initial value elements 202 may represent initial values for nested loop index variable values that are associated with a tensor, a prologue array, or an epilogue array. For example, the program may define a prologue loop for accessing the variable V1. The prologue loop can be indexed by nested loop index variable h. In this example, the tensor traversal unit may assign initial value element $V_{1,1}$ to store the initial value for the nested loop index variable h.

Similarly, if the program defines a nested loop having three loops for accessing the variable V2, where each loop of the nested loop is indexed by nested loop index variables i, j, and k, the tensor traversal unit may assign initial value elements $V_{2,1}$, $V_{2,2}$, and $V_{2,3}$ to store the initial value for the nested loop index variable i, j, and k, respectively. If the program defines an epilogue loop for accessing a variable V3 where the loop is indexed by nested loop index variable l, the tensor traversal unit may assign initial value element $V_{3,1}$ to store the initial value for the nested loop index variable l. The order of the prologue, tensor, and epilogue rows within the initial value elements array can vary. For example, in another implementation, the row 202a may store the initial value for an epilogue and the row 204a may store the initial value for the prologue row. The initial value elements 202 are described in more detail below with reference to FIGS. 2B-2J.

The step value elements 204 may be physically or logically arranged as a 2-D array having the same dimensions as the initial value elements 202, where each element of the step value elements 204 has a corresponding element in the initial value elements 202. The step value elements 204 may store step values of address offsets used to determine a memory address for a tensor element, a prologue data element, and/or an epilogue data element. In some implementations, each row of the step value elements 204 may represent step values for a tensor, a prologue, or an epilogue. For example, if a program defines two array variables V1 and V2, the tensor traversal unit may assign rows 204a and 204b to store the step values for array variables V1 and V2, respectively. In some implementations, each column of the step value elements 204 may represent step values for nested loop index variable values that are associated with a tensor, prologue, or epilogue. For example, if the program defines a prologue loop for accessing the variable V1, where the prologue loop is indexed by loop index variable h, the tensor traversal unit may assign step value elements $X_{1,1}$ to store the step value for the nested loop index variable h. Similarly, if the program defines a nested loop having three loops for accessing the variable V2, where each loop of the nested loop is indexed by nested loop index variables i, j, and k, the tensor traversal unit may assign step value elements $X_{2,1}$, $X_{2,2}$, and $X_{2,3}$ to store the step value for the nested loop index variable i, j, and k, respectively. If the program defines an epilogue loop for accessing a variable V3 where the loop is indexed by nested loop index variable l, the tensor traversal unit may assign step value element $X_{3,1}$ to store the initial value for the nested loop index variable l. The step value elements 204 are described in more detail below with reference to FIGS. 2B-2J.

The end value elements 206 may be physically or logically arranged as a 2-D array having the same dimensions as the initial value elements 202, where each element of the end value elements 206 has a corresponding element in the initial value elements 202. The end value elements 206 may store ends values of address offsets used to determine a memory address for a tensor element, a prologue data element, and/or an epilogue data element. In some implementations, each row of the end value elements 206 may represent end values for a tensor, a prologue, or an epilogue. For example, if a program defines two array variables V1 and V2, the tensor traversal unit may assign rows 206a and 206b to store the end values for array variables V1 and V2, respectively. In some implementations, each column of the end value elements 206 may represent end values for nested loop index variable values that are associated with a tensor, prologue, or epilogue. For example, if the program defines a nested loop having a prologue loop for accessing the variable V1, where the prologue loop is indexed by nested loop index variable h, the tensor traversal unit may assign end value element $Y_{1,1}$ to store the end value for the loop index variable h.

Similarly, if the program defines a nested loop having three loops for accessing the variable V2, where each loop of the nested loop is indexed by nested loop index variables i, j, and k, the tensor traversal unit may assign end value elements $Y_{1,1}$, $Y_{1,2}$, and $Y_{1,3}$ to store the end value for the nested loop index variable i, j, and k, respectively. If the program defines an epilogue loop for accessing the variable V3, where the epilogue loop is indexed by nested loop variable l, the tensor traversal unit may assign end value element $Y_{3,1}$ to store the end value for the loop index variable l. The end value elements 206 are described in more detail below with reference to FIGS. 2B-2J.

The address offset value element 208 may be physically or logically arranged as a 2-D array having the same dimensions as the initial value elements 202, where each element of the address offset value elements 208 has a corresponding element in the initial value elements 202. The address offset value elements 206 may store address offset values used to determine a memory address for a tensor element, a prologue data element, and/or an epilogue data element. In some implementations, each row of the address offset value elements 208 may represent partial address offset values for a tensor, a prologue, or an epilogue. For example, a tensor or data array may include multiple dimensions. In this example, a row of address offset values may include a partial address offset element for each dimension.

For example, if a program defines two array variables V1 and V2, the tensor traversal unit may assign rows 208a and 208b to store the address offset values for array variables V1 and V2, respectively. In some implementations, each column of the address offset value elements 208 may represent partial address offset values for nested loop index variable values that are associated with a tensor, prologue, or epilogue. For example, if the program defines a nested loop having a prologue loop for accessing the variable V1, where the prologue loop is indexed by nested loop index variable h, the tensor traversal unit may assign address offset value element $Z_{1,1}$ to store the address offset value for the loop index variable h.

Similarly, if the program defines a nested loop having three loops for accessing the variable V2, where each loop of the nested loop is indexed by nested loop index variables i, j, and k, the tensor traversal unit may assign address offset value elements $Z_{2,1}$, $Z_{2,2}$, and $Z_{2,3}$ to store the address offset value for the nested loop index variable i, j, and k, respectively. If the program defines an epilogue loop for accessing the variable V3, where the epilogue loop is indexed by nested loop variable l, the tensor traversal unit may assign address value element $Z_{3,1}$ to store the address value for the loop index variable l. The address offset value elements 208 are described in more detail below with reference to FIGS. 2B-2J.

FIGS. 2B-2J show an example of how the tensor address value elements 200 may be used by a tensor traversal unit to process a tensor, including determining memory address values for tensor elements of the tensor and memory addresses for prologue data elements. Although the example includes a tensor and a prologue, a similar process can be used to determine memory address for a combination of one or more tensors and one or more epilogues and a combination of one or more prologues, one or more tensors, and one or more epilogues.

Figure 2B:
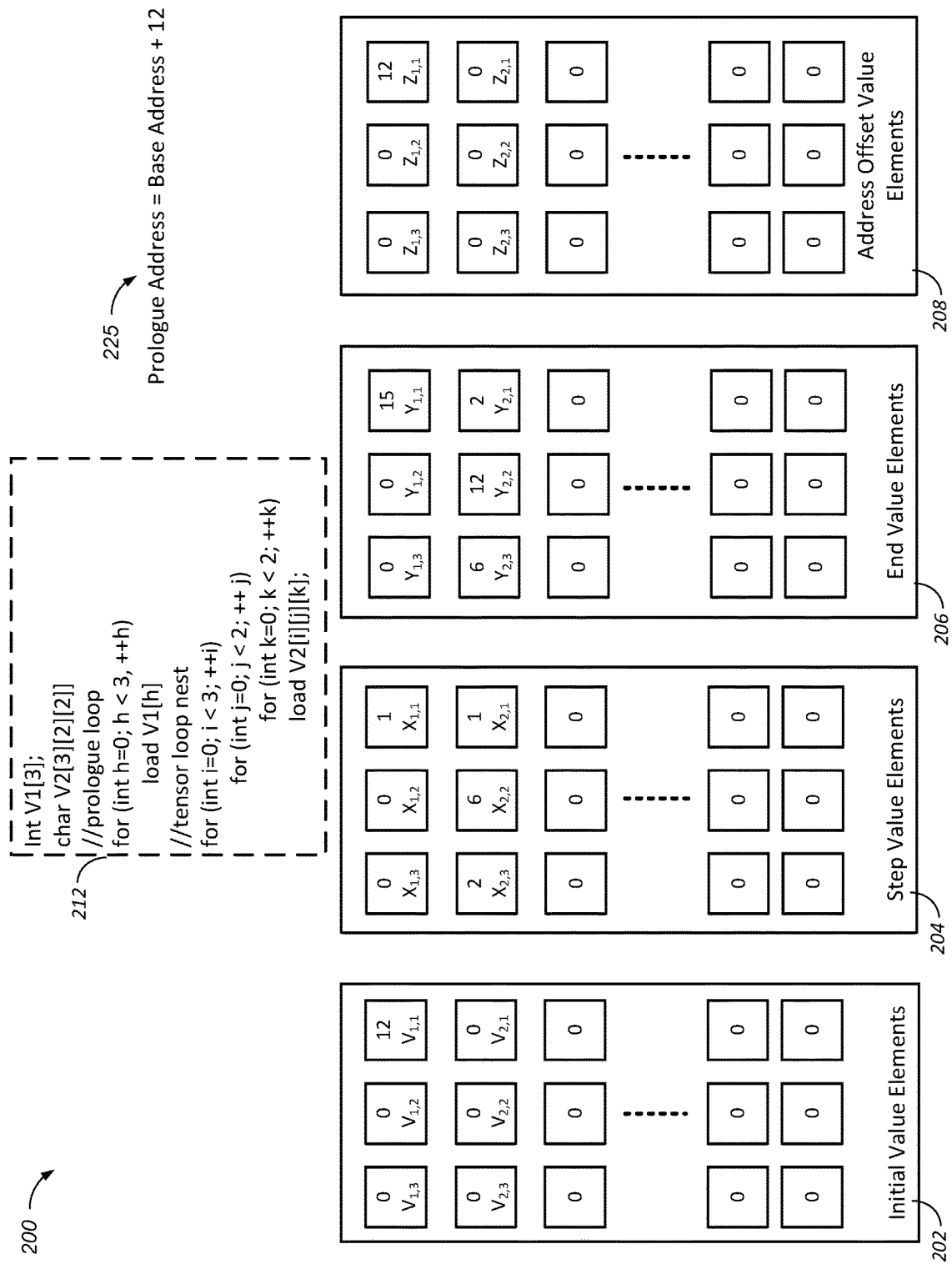

Referring to FIG. 2B, a program 212 may be stored in the storage medium 104 or another storage medium that can be executed by the processing unit 102. The program 212 specifies an integer array variable V1 having a single dimension of three and a character array variable V2 having a first dimension of four, a second dimension of two, and a third dimension of two. The program 212 specifies a nested for-loop for traversing the variable V2, where the for-loop traverses the first dimension of V2 in an outer loop tracked by a nested loop index variable i; traverses the second dimension of V2 in a middle loop tracked by a nested loop index variable j; and traverses the third dimension of V in an inner loop tracked by a nested loop index variable k. The program 212 also specified a prologue for-loop for traversing the variable V1 using loop index variable h.

Although the illustrated example of FIGS. 2B-2J described herein includes three dimensions, memory address values for tensors having different numbers of dimensions (e.g., 2, 5, 8, or some other number of dimensions) can be determined in a similar manner. For example, a tensor having eight dimensions may be traversed and the memory addresses for the tensor elements can be determined using an 8-deep loop nest.

In some implementations, the tensor address value elements 200 may be initialized at the beginning of a program. For example, the tensor traversal unit may initialize the tensor address value elements 200 based on the program 212. In some implementations, after initialization, each element of the tensor address value elements 200 is set to a value determined by the tensor traversal unit. In some implementations, the processor may execute a separate instruction for each group of tensor address value elements, e.g., one for the initial value elements 202, one for the step values, elements, and so on. Each separate instruction may set each element of its group to a respective value for that element. As described above, the tensor traversal unit may determine initial values, end values, and step values for each prologue, tensor, and epilogue based on the number of elements in each loop such that each element is assigned a unique memory address.

In this example, the initial value element for the prologue is set to a value of twelve and each initial value element for the tensor is set to a value of zero. The initial value for a dimension of a tensor or for a prologue or epilogue is a value to which the address offset value for the dimension, prologue, or epilogue is set for a first memory address determination after initialization.

The step value elements may store step values of address offsets used to determine a memory address for a tensor element, prologue element, or epilogue element. The step value for a dimension, prologue, or epilogue is a value that is added to the address offset value for the dimension, prologue, or epilogue after each iteration for the dimension, prologue, or epilogue. In this example, the inner nested loop index variable k has a step value of one, the middle nested loop index variable j has a step value of six, and the outer nested loop index variable i has a step value of two. Similarly, the prologue has a step value of one.

In some implementations, the processor, a user, or a compiler that compiles a program for traversing a tensor determines the step value and/or end value for each dimension based on a number of elements in one or more of the dimensions of the tensor. In this way, the memory addresses computed for each tensor element is different from the memory address for each other tensor element. In some implementations, the memory addresses are determined such that the sequence of elements accessed during the traversal are physically contiguous in memory. In this example, the first tensor element may be stored at a first memory location with a first address, the second tensor element may be stored at a second memory location directly next to the first memory location, the third tensor element may be stored at a third memory location directly next to the second memory location, and so on. In some implementations, the memory addresses are determined such that the sequence of elements accessed during the traversal are not physically contiguous in memory. In this example, the second tensor element may not be stored directly next to the first tensor element.

The end value elements can store end values for the dimensions, prologues, and/or epilogues. The end value for a dimension, prologue, or epilogue represents a value at which, when the address offset value for the dimension, prologue, or epilogue equals or exceeds the end value, the address offset value is reset to the initial value for the dimension, prologue, or epilogue.

The address offset value elements 208 store address offset values for the dimensions. In this example, the address offset value for the prologue has been initialized to twelve based on the initial value for the prologue. Similarly, the address offset value for each dimension of the tensor have been initialized to zero. The address offset values are used to determine a memory address offset for a tensor element or a data element. In some implementations, the memory address for a particular tensor element or particular data element for a particular variable is based on a sum of a pre-specified base address for the elements and the address offset values for dimensions of the elements, as shown in the equation 225. For variable V1, the memory address for a particular prologue element is equal to the sum of the base address for the prologue elements and the address offset values in row 208a (top row). In this example, the prologue has a single dimension. Thus, the memory address for each prologue element is based on a sum of the base address for the prologue and the value of the address offset value stored in address offset element $Z_{1,1}$.

For a one-dimensional tensor, prologue, or epilogue, the tensor traversal unit adds the step value for the tensor, prologue, or epilogue to the address offset value after each address determination for the tensor, prologue, or epilogue. In this way, the address offset value is different for the next address determination for the tensor, prologue, or epilogue. When the address offset value for the tensor, prologue, or epilogue for the one-dimensional tensor, prologue, or epilogue equals or exceeds the end value for the tensor, prologue, or epilogue, the tensor traversal unit transitions to the next tensor, prologue, or epilogue as all memory addresses for the one-dimensional tensor, prologue, or epilogue have been determined when the address offset value equals or exceeds the end value. The example prologue illustrated in FIGS. 2B-2J demonstrate the address determination for a one-dimensional prologue. The same or a similar technique can be used to determine memory addresses for one-dimensional tensors and one-dimensional epilogues.

A multi-dimensional tensor, prologue, or epilogue can be represented in the instruction as a loop nest with multiple nested loops. In a loop nest, when all iterations of an inner loop have been executed, the next outer loop in which the inner loop is nested is iterated. The tensor traversal unit can determine memory addresses for a multi-dimensional tensor in a similar manner by iterating the address offset value of an outer dimension after the last iteration of the address offset value of an inner dimension.

In the illustrated example, each column of the initial value elements 202, the step value elements 204, the end values elements 206, and the address offset value elements 208 correspond to a particular dimension. The right-most column can represent the dimension that corresponds to the inner-most loop, the column directly to the left of the right-most column can represent the next outer most loop, and so on to the left-most column which can represent the dimension that corresponds to the outer-most loop. In this example, the right-most column of each set of elements 202-208 may be populated with non-zero values for one-dimensional tensors, prologues, or epilogues as there are no additional dimensions that correspond to the other columns. In other implementations, each set of elements may be arranged differently such that the dimensions are represented by rows or the left-most column may correspond to the inner-most loop.

For a multi-dimensional tensor, prologue, or epilogue, when the address offset value for a particular dimension equals or exceeds the end value for the particular dimension, the tensor traversal unit can reset the address offset value for the particular dimension to its initial value and increment the address offset value for the dimension in which the loop for the particular dimension is nested. For example, if the address offset value for the dimension represented by the right-most elements equals or exceeds its end value, the address offset value may be reset to tis initial value and the address offset value for the dimension represented by the column that is second from the right may be incremented using its step value. The example tensor illustrated in FIGS. 2B-2J demonstrate the address determination for a multi-dimensional-dimensional tensor. The same or a similar technique can be used to determine memory addresses for multi-dimensional prologues and multi-dimensional epilogues.

The memory address for the tensors elements and data elements of the prologue and/or epilogue can be determined using the math unit 124 of FIG. 1. For example, the input to an adder for a particular variable (e.g., variable V1) may be the base address and the values of each address offset value element in the row for the variable (e.g., row 208a for variable V1). The output is the memory address for the variable. The memory address for each tensor element and/or the memory address for each data element of the prologue and/or epilogue can be output for use by the processing unit 102. For example, the memory addresses may be output to a bus or to the storage medium 104.

The tensor traversal unit may determine the memory addresses for the tensor element and the data elements row by row. For example, the tensor traversal unit may first determine the memory addresses for the data elements of the prologue using the address offset values in row 208a. After the tensor traversal unit has determined the memory addresses for each prologue data element, the tensor traversal unit may move to the second row 208b and determine the memory addresses for the tensor elements of the tensor. If the program included an epilogue with values in the third row, the tensor traversal unit would move to the third row and determine memory addresses for the epilogue data elements after the memory addresses for the tensor elements have been determined.

FIG. 2B illustrates accessing the prologue data element V1[0]. For example, the tensor traversal unit may receive an instruction from an FSM to begin determining memory addresses based on the received instruction that specifies the loops for the prologue and the tensor. In response, the tensor traversal unit may start determining memory addresses for the prologue data elements based on the first row 208a of address offset elements. In a first iteration of determining memory addresses for the prologue data elements, the address offset element $Z_{1,1}$ has a value of 12 based on the initial value for the prologue as shown in initial value element $V_{1,1}$. In this example, the memory address for the first prologue data element V1[0] is equal to a base address for the prologue plus twelve as shown in equation 225. The math unit 124 can determine the memory address by determining the sum of the base address and the current address offset value in address offset element $Z_{1,1}$. The tensor traversal unit can then output the determined memory address, e.g., to the processing unit 102, the storage medium 104, or to a data bus. The processing unit 102 can then access the prologue data element V1[0] using the determined memory address.

Figure 2C:
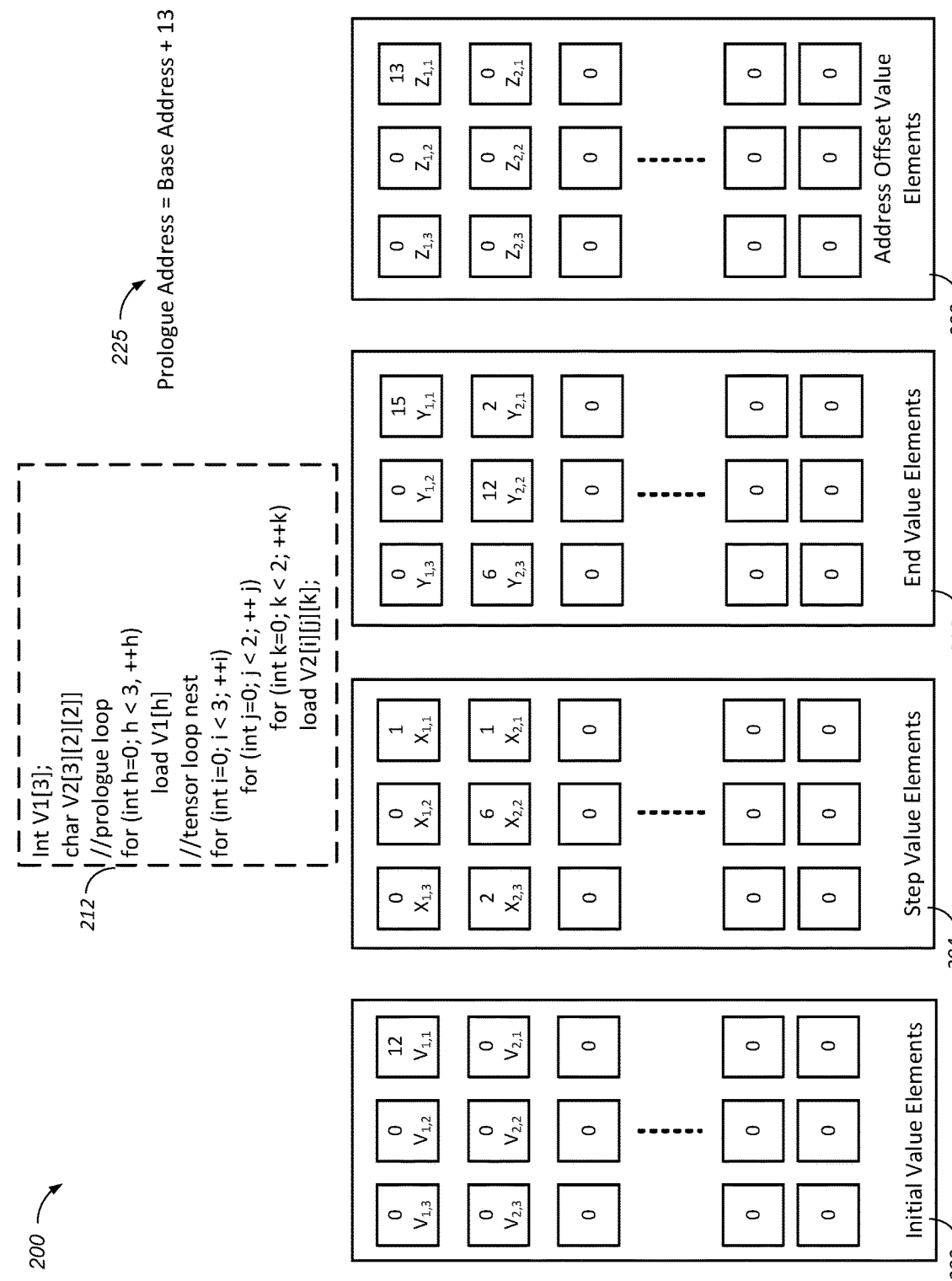

FIG. 2C illustrates accessing the prologue data element V1[1]. After the tensor traversal unit determines the memory address for prologue data element V1[0], the tensor traversal unit can update the address offset value for the prologue by incrementing the address offset value for the prologue using the step value for the prologue. In particular, the tensor traversal unit can add, e.g., using the math unit 124, the step value in step value element $X_{1,1}$ to the address offset value in address offset value element $Z_{1,1}$. In this example, the tensor traversal unit added the step value of one to the previous address offset value of twelve to get an address offset value of thirteen.

In some implementations, the tensor traversal unit compares the updated offset address value stored in element $Z_{1,1}$ to the end value for the prologue stored in element $Y_{1,1}$. If the updated offset address value stored in $Z_{1,1}$ equals or exceeds the end value for the prologue stored in element $Y_{1,1}$, the tensor traversal unit may reset the value of the offset address value stored in element $Z_{1,1}$ to the initial value for the prologue stored in element $V_{1,1}$. As the example prologue includes a one dimension array, when the address offset value stored in element $Z_{1,1}$ equals or exceeds the end value stored in element $Y_{1,1}$, all of the memory addresses for the prologue have been determined and the tensor traversal unit can move to the next row.

If the updated offset address value stored in element $Z_{1,1}$ is less than the end value for the prologue stored in element $Y_{1,1}$, the tensor traversal unit may keep the updated address value for the prologue stored in element $Z_{1,1}$. In this example, the updated address offset value for the prologue (13) is less than the end value for the inner loop (15). Thus, the tensor traversal unit keeps the updated address offset value stored in the address offset element $Z_{1,1}$ for the prologue.

The math unit 124 can determine the memory address for prologue data element V1[1] by determining the sum of the base address and the current address offset value in address offset element $Z_{1,1}$. In this example, the memory address is the sum of the base address and thirteen. The tensor traversal unit can then output the determined memory address, e.g., to the processing unit 102, the storage medium 104, or to a data bus. The processing unit 102 can then access the prologue data element V1[1] using the determined memory address.

Figure 2D:
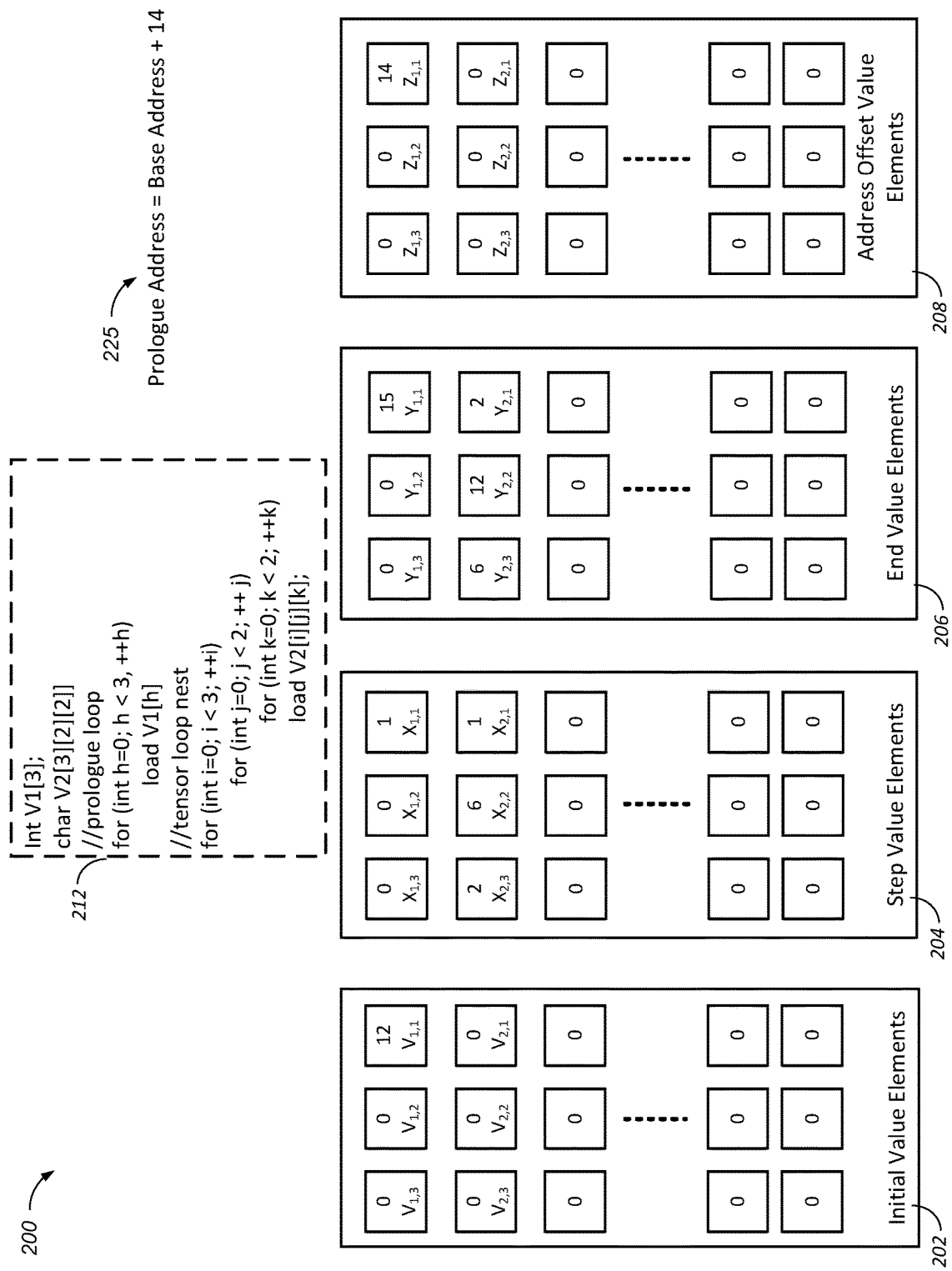

FIG. 2D illustrates accessing the prologue data element V1[2]. After the tensor traversal unit determines the memory address for prologue data element V1[1], the tensor traversal unit can update the address offset value for the prologue by incrementing the address offset value for the prologue using the step value for the prologue. In particular, the tensor traversal unit can add, e.g., using the math unit 124, the step value in step value element $X_{1,1}$ to the address offset value in address offset value element $Z_{1,1}$. In this example, the tensor traversal unit added the step value of one to the previous address offset value of thirteen to get an address offset value of fourteen.

The tensor traversal unit can again compare the updated offset address value stored in element $Z_{1,1}$ to the end value for the prologue stored in element $Y_{1,1}$. Here, the updated address offset value stored in element $Z_{1,1}$ (14) still does not equal or exceed the end value stored in element $Y_{1,1}$ (15). Thus, the tensor traversal unit keeps the updated address offset value stored in the address offset element $Z_{1,1}$ for the prologue.

The math unit 124 can determine the memory address for prologue data element V1[2] by determining the sum of the base address and the current address offset value in address offset element $Z_{1,1}$. In this example, the memory address is the sum of the base address and fourteen. The tensor traversal unit can then output the determined memory address, e.g., to the processing unit 102, the storage medium 104, or to a data bus. The processing unit 102 can then access the prologue data element V1[2] using the determined memory address.

After determining the memory address for the prologue data element V1[2], the tensor traversal unit can update the address offset value for the prologue by incrementing the address offset value for the prologue using the step value for the prologue. In particular, the tensor traversal unit can add, e.g., using the math unit 124, the step value in step value element $X_{1,1}$ to the address offset value in address offset value element $Z_{1,1}$. In this example, the tensor traversal unit added the step value of one to the previous address offset value of fourteen to get an address offset value of fifteen.

The tensor traversal unit can again compare the updated offset address value stored in element $Z_{1,1}$ to the end value for the prologue stored in element $Y_{1,1}$. Here, the updated address offset value stored in element $Z_{1,1}$ (15) equals the end value stored in element $Y_{1,1}$ (15). As the updated offset address value stored in $Z_{1,1}$ equals the end value for the prologue stored in element $Y_{1,1}$, the tensor traversal unit resets the value of the offset address value stored in element $Z_{1,1}$ to the initial value for the prologue stored in element $V_{1,1}$. As the example prologue includes a one dimension array and the memory addresses for each prologue has been determined, the tensor traversal unit can move to the next row.

The second row includes the values for the tensor. In particular, the address offset value elements $Z_{2,1}$, $Z_{2,2}$, and $Z_{3,3}$ store the address offset values for the tensor elements. The memory address for a particular tensor element is the sum of the current values stored in the address offset values $Z_{2,1}$, $Z_{2,2}$, and $Z_{3,3}$ and the base address. The base address for the tensor elements may be the same as the base address for the prologue elements. In other examples, the base address for the tensor elements may be different from the base address for the prologue data elements.

Figure 2E:
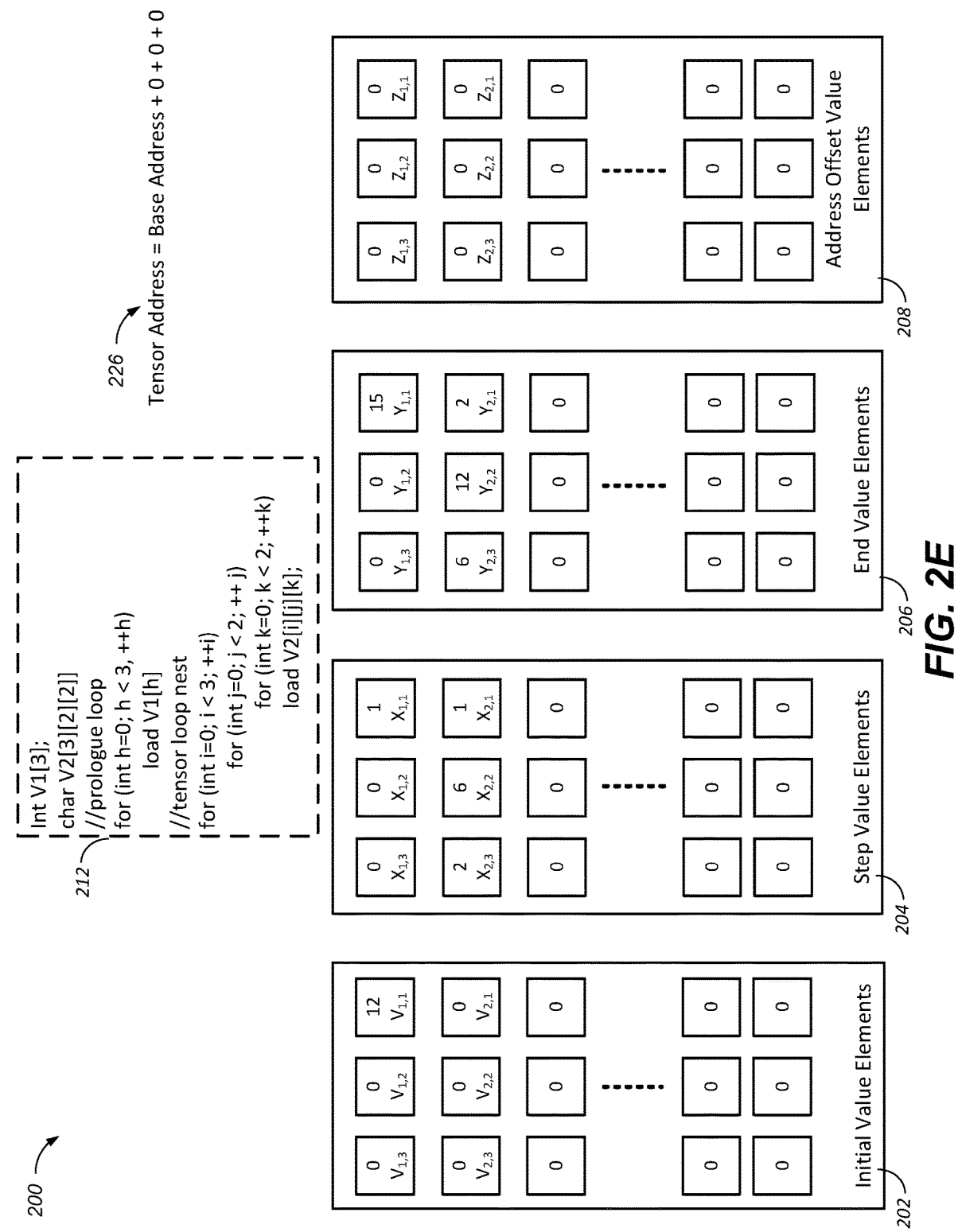

FIG. 2E illustrates accessing the tensor element V2[0][0][0]. In a first iteration of determining memory addresses for the tensor elements, each address offset elements $Z_{2,1}$, $Z_{2,2}$, and $Z_{2,3}$ has a value of zero based on the initial values for the tensor as shown in initial value elements $V_{2,1}$, $V_{2,2}$, $V_{2,3}$. In this example, the memory address for the first tensor element V2[0][0][0] is equal to a base address for the tensor plus zero as shown in equation 226. The math unit 124 can determine the memory address by determining the sum of the base address and the current address offset value stored in address offset elements $Z_{2,1}$, $Z_{2,2}$, and $Z_{2,3}$. The tensor traversal unit can then output the determined memory address, e.g., to the processing unit 102, the storage medium 104, or to a data bus. The processing unit 102 can then access the tensor element V2[0][0][0] using the determined memory address.

Figure 2F:
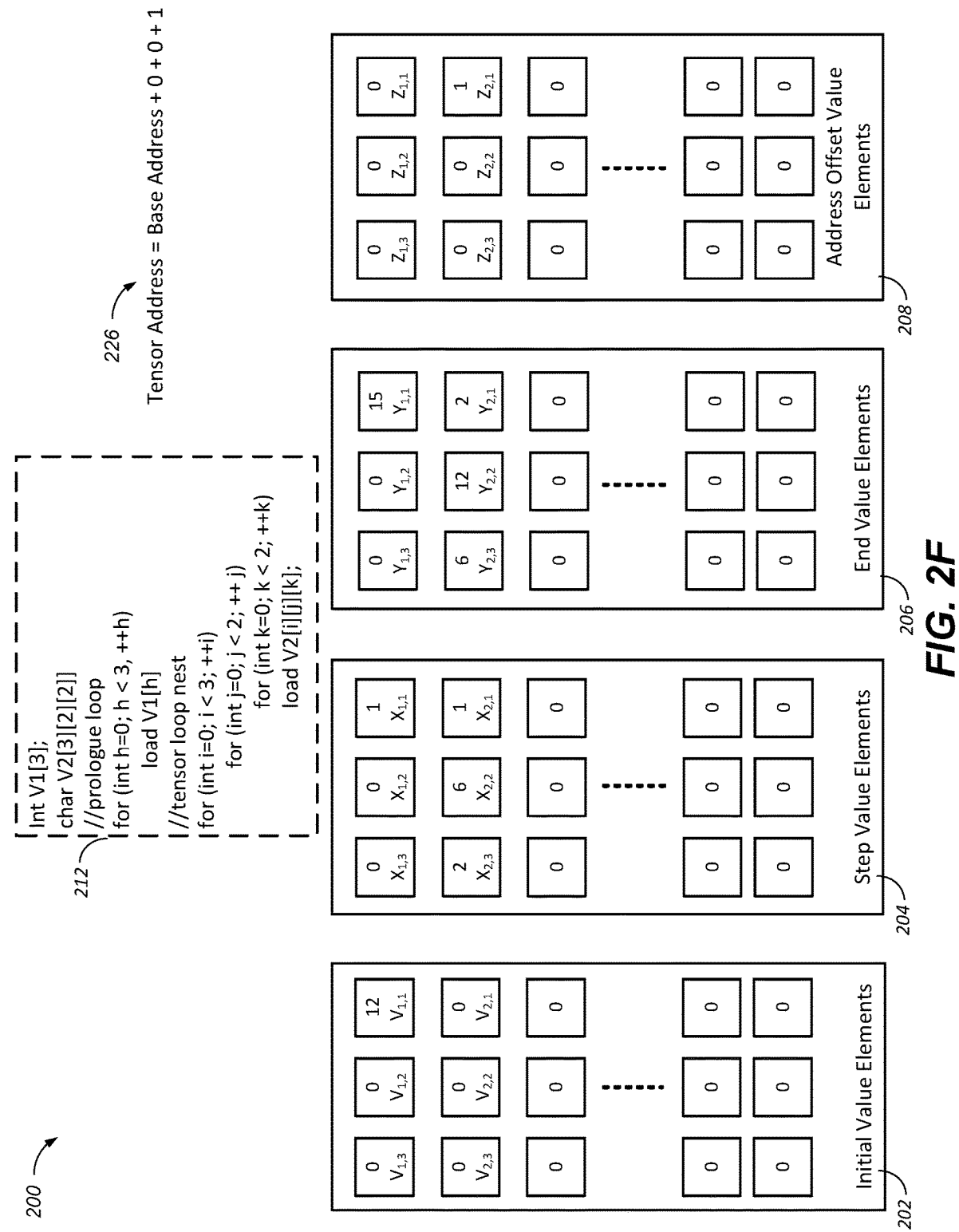

FIG. 2F illustrates accessing the element V2[0][0][1]. After the tensor traversal unit determines the memory address for tensor element V2[0][0][0], the tensor traversal unit can update the address offset value for the tensor by incrementing the address offset value for the dimension represented by the inner loop of the program 212. In this example, the dimension represented by the inner loop is the right-most address element $Z_{2,1}$. Thus, the tensor traversal unit can update the address offset values for the tensor by incrementing the address value element $Z_{2,1}$ by its corresponding step value stored in step value element $X_{2,1}$. In this example, the step value (1) is added to the address offset value (0) to get an address offset value of one.

In some implementations, the tensor traversal unit compares the updated offset address value stored in element $Z_{2,1}$ to the end value stored in element $Y_{2,1}$. If the updated offset address value stored in $Z_{2,1}$ equals or exceeds the end value stored in element $Y_{2,1}$, the tensor traversal unit may reset the value of the offset address value stored in element $Z_{2,1}$ to the initial value stored in element $V_{2,1}$. In addition, the tensor traversal unit can increment the address offset value for the dimension corresponding to the dimension corresponding to the middle loop stored in element $Z_{2,2}$ by the step value for the dimension corresponding to the middle loop stored in $X_{2,2}$, as described in more detail below.

If the updated offset address value stored in element $Z_{2,1}$ is less than the end value stored in element $Y_{2,1}$, the tensor traversal unit may keep the updated address value stored in element $Z_{2,1}$. In this example, the updated address offset value (1) is less than the end value (2). Thus, the tensor traversal unit keeps the updated address offset value stored in the address offset element $Z_{2,1}$ for the dimension corresponding to the middle loop without incrementing the address offset value for the dimension corresponding to the middle loop.

The math unit 124 can determine the memory address for tensor element V2[0][0][1] by determining the sum of the base address and the current address offset values stored in address offset elements $Z_{2,1}$, $Z_{2,2}$, $Z_{2,3}$. In this example, the memory address is the sum of the base address and one, as shown in equation 226. The tensor traversal unit can then output the determined memory address, e.g., to the processing unit 102, the storage medium 104, or to a data bus. The processing unit 102 can then access the tensor element V2[0][0][1] using the determined memory address.

Figure 2G:
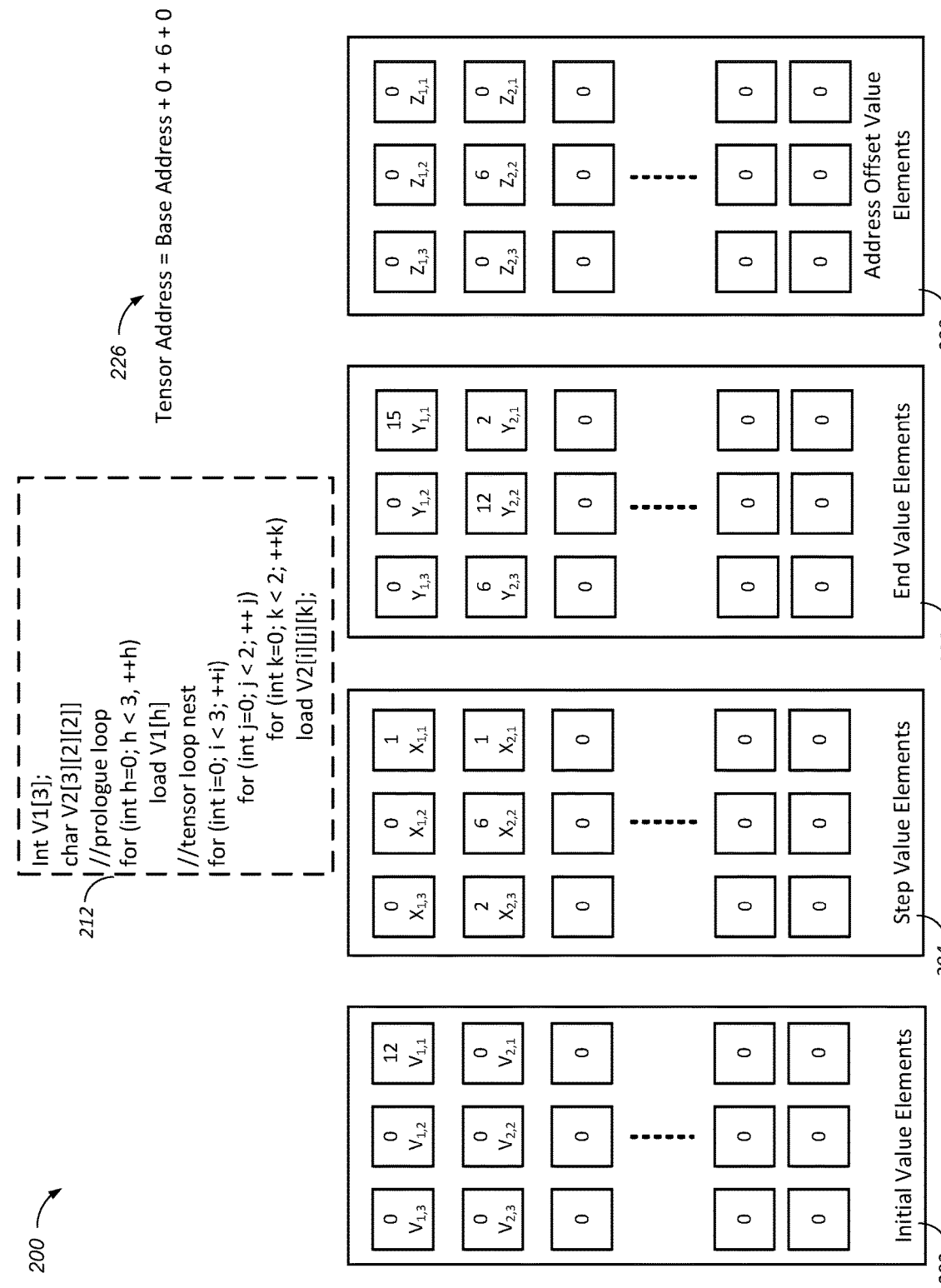

FIG. 2G illustrates accessing the element V2[0][1][0]. After the tensor traversal unit determines the memory address for tensor element V2[0][0][1], the tensor traversal unit can update the address offset value for the tensor by incrementing the address offset value for the dimension represented by the inner loop of the program 212. In this example, the tensor traversal unit can update the address offset values for the tensor by incrementing the address value element $Z_{2,1}$ by its corresponding step value stored in step value element $X_{2,1}$. In this example, the step value (1) is added to the address offset value (1) to get an address offset value of two.

The tensor traversal unit can compare the updated offset address value stored in element $Z_{2,1}$ to the end value for the dimension corresponding to the inner loop stored in element $Y_{2,1}$. If the updated offset address value stored in $Z_{2,1}$ equals or exceeds the end value stored in element $Y_{2,1}$, the tensor traversal unit may reset the value of the offset address value stored in element $Z_{2,1}$ to the initial value for the inner loop stored in element $V_{2,1}$. In addition, the tensor traversal unit may increment the address offset value for the dimension corresponding to the middle loop stored in element $Z_{2,2}$ by the step value for the dimension corresponding to the middle loop stored in $X_{2,2}$.

If the updated offset address value stored in element $Z_{2,1}$ is less than the end value stored in element $Y_{2,1}$, the tensor traversal unit may keep the updated address value for the dimension corresponding to the inner loop stored in element $Z_{2,1}$. In this example, the updated address offset value for the inner loop (2) equals the end value for the inner loop (2). Thus, the tensor traversal unit resets the offset address value stored in element $Z_{2,1}$ to the initial value stored in element $V_{2,1}$. In addition, the tensor traversal unit increments the address offset value for the dimension corresponding to the middle loop stored in element $Z_{2,2}$ by the step value for the dimension corresponding to the middle loop stored in $X_{2,2}$. In this example, the updated address offset value for the dimension corresponding to the middle loop is 6 (0+6).

In some implementations, the tensor traversal unit compares the updated offset address value for the dimension corresponding to the middle loop stored in element $Z_{2,2}$ to the end value for the dimension corresponding to the middle loop stored in element $Y_{2,2}$ in response to determining the updating the offset address value for the middle loop. If the updated offset address value stored in $Z_{2,2}$ equals or exceeds the end value stored in element $Y_{2,2}$, the tensor traversal unit may reset the value of the offset address value stored in element $Z_{2,2}$ to the initial value for the dimension corresponding to the middle loop stored in element $V_{2,2}$. In addition, the tensor traversal unit may increment the address offset value for the dimension corresponding to the outer loop stored in element $Z_{2,3}$ by the step value for the outer loop stored in $X_{2,3}$, as described below.

If the updated offset address value for the middle loop stored in element $Z_{2,1}$ is less than the end value for the dimension corresponding to the middle loop stored in element $Y_{2,2}$, the tensor traversal unit may keep the updated address value for the dimension corresponding middle loop stored in element $Z_{2,2}$. In this example, the updated address offset value for the dimension corresponding to the middle loop (6) is less than the end value for the inner loop (12).

Thus, the tensor traversal unit keeps the updated address offset value stored in the address offset element $Z_{2,2}$ for the dimension corresponding to the middle loop without incrementing the address offset value for the dimension corresponding to the outer loop.

The math unit 124 can determine the memory address for tensor element V2[0][1][0] by determining the sum of the base address and the current address offset values stored in address offset elements $Z_{2,1}$, $Z_{2,2}$, $Z_{2,3}$. In this example, the memory address is the sum of the base address and six, as shown in equation 226. The tensor traversal unit can then output the determined memory address, e.g., to the processing unit 102, the storage medium 104, or to a data bus. The processing unit 102 can then access the tensor element V2[0][1][0] using the determined memory address.

Figure 2H:
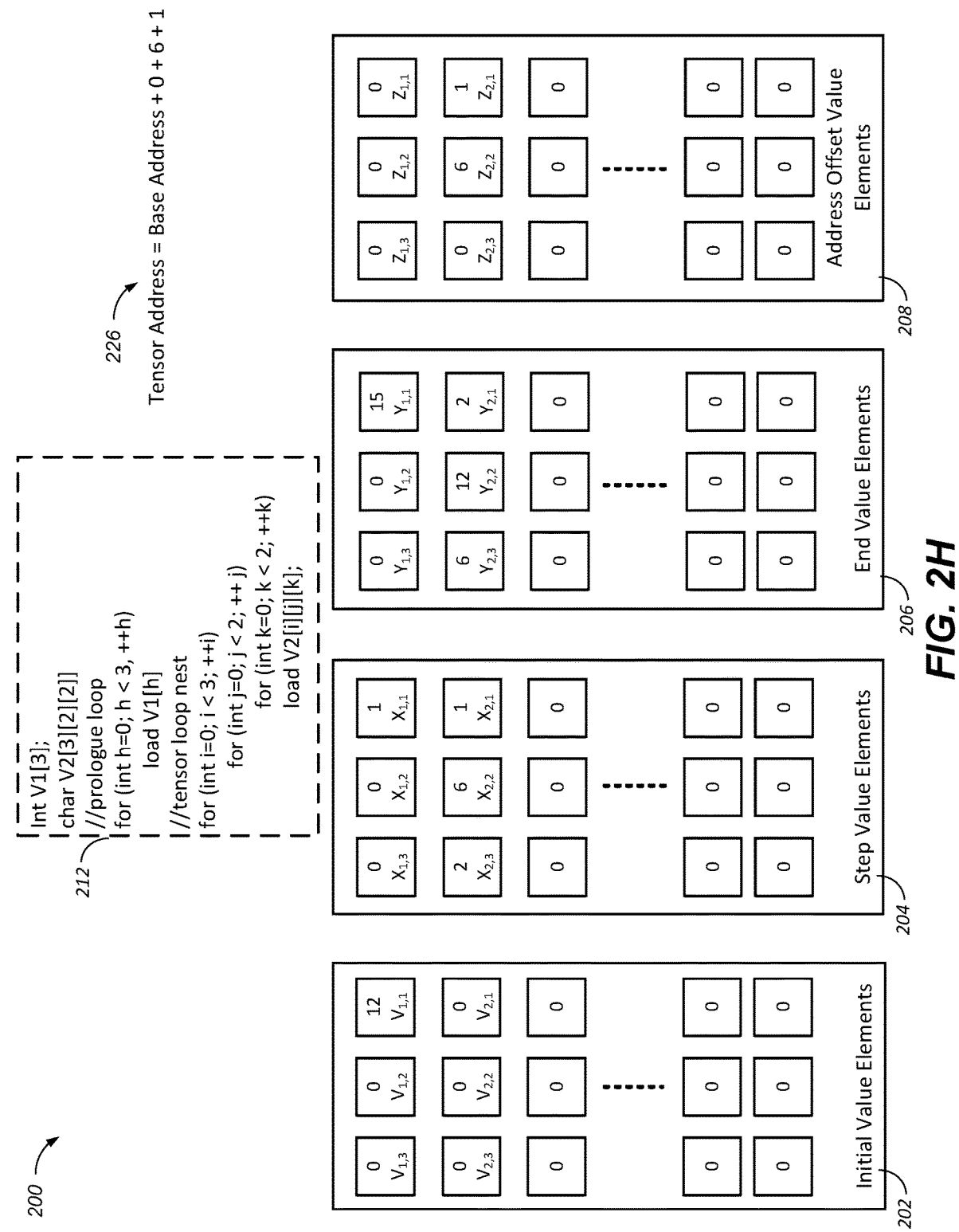

FIG. 2H illustrates accessing the element V2[0][1][1]. After the tensor traversal unit determines the memory address for tensor element V2[0][1][0], the tensor traversal unit can update the address offset value for the tensor by incrementing the address offset value for the dimension represented by the inner loop of the program 212. In this example, the tensor traversal unit can update the address offset values for the tensor by incrementing the address value element $Z_{2,1}$ by its corresponding step value stored in step value element $X_{2,1}$. In this example, the step value (1) is added to the address offset value (0) to get an address offset value of one.

The tensor traversal unit can compare the updated offset address value stored in element $Z_{2,1}$ to the end value for the dimension corresponding to the inner loop stored in element $Y_{2,1}$. Here, the updated offset address value stored in element $Z_{2,1}$ is less than the end value stored in element $Y_{2,1}$. Thus, the tensor traversal unit keeps the updated address value for the dimension corresponding to the inner loop stored in element $Z_{2,1}$.

The math unit 124 can determine the memory address for tensor element V2[0][1][1] by determining the sum of the base address and the current address offset values stored in address offset elements $Z_{2,1}$, $Z_{2,2}$, $Z_{2,3}$. In this example, the memory address is the sum of the base address and seven. The tensor traversal unit can then output the determined memory address, e.g., to the processing unit 102, the storage medium 104, or to a data bus. The processing unit 102 can then access the tensor element V2[0][1][1] using the determined memory address.

Figure 2I:
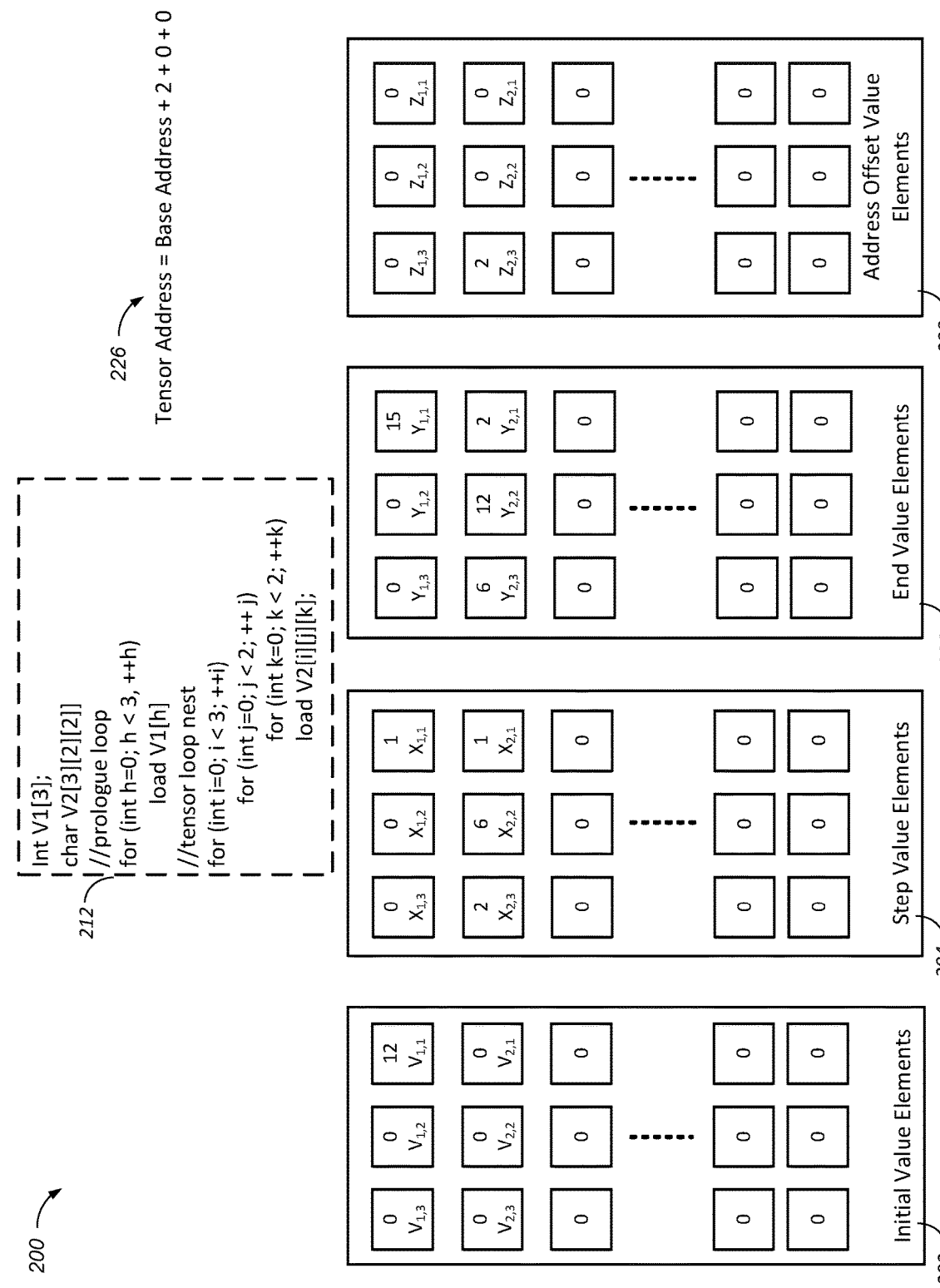

FIG. 2I illustrates accessing the element V2[1][0][0]. After the tensor traversal unit determines the memory address for tensor element V2[0][1][1], the tensor traversal unit can update the address offset value for the tensor by incrementing the address offset value for the dimension represented by the inner loop of the program 212. In this example, the tensor traversal unit can update the address offset values for the tensor by incrementing the address value element $Z_{2,1}$ by its corresponding step value stored in step value element $X_{2,1}$. In this example, the step value (1) is added to the address offset value (1) to get an address offset value of two.

The tensor traversal unit can compare the updated offset address value stored in element $Z_{2,1}$ to the end value for the dimension corresponding to the inner loop stored in element $Y_{2,1}$. Here, the updated offset address value stored in $Z_{2,1}$ equals the end value for the inner loop stored in element $Y_{2,1}$. Thus, the tensor traversal unit can reset the value of the offset address value stored in element $Z_{2,1}$ to the initial value for the inner loop stored in element $V_{2,1}$. In addition, the tensor traversal unit can increment the address offset value for the dimension corresponding to the middle loop stored in element $Z_{2,2}$ by the step value for the dimension corresponding to the middle loop stored in $X_{2,2}$. In this example, the updated address offset value for the dimension corresponding to the middle loop is 12 (6+6).

The tensor traversal unit can compare the updated offset address value for the dimension corresponding to the middle loop stored in element $Z_{2,2}$ to the end value for the dimension corresponding to the middle loop stored in element $Y_{2,2}$ in response to determining the updating the offset address value for the dimension corresponding to the middle loop. If the updated offset address for the dimension corresponding to the middle loop value stored in $Z_{2,2}$ equals the end value stored in element $Y_{2,2}$, the tensor traversal unit may reset the value of the offset address value stored in element $Z_{2,2}$ to the initial value for the middle loop stored in element $V_{2,2}$. In addition, the tensor traversal unit may increment the address offset value for the dimension corresponding to the outer loop stored in element $Z_{2,3}$ by the step value for the outer loop stored in $X_{2,3}$.

If the updated offset address value for the dimension corresponding to the middle loop stored in element $Z_{2,2}$ is less than the end value for the dimension corresponding to the middle loop stored in element $Y_{2,2}$, the tensor traversal unit may keep the updated address value for the middle loop stored in element $Z_{2,2}$. In this example, the updated address offset value for the middle loop (12) equals the end value for the middle loop (12). Thus, the tensor traversal unit resets the offset address value stored in element $Z_{2,2}$ to the initial value stored in element $V_{2,2}$. In addition, the tensor traversal unit increments the address offset value for the dimension corresponding to the outer loop stored in element $Z_{2,3}$ by the step value for the dimension corresponding to the outer loop stored in $X_{1,3}$. In this example, the updated address offset value for the dimension corresponding to the outer loop is 2 (0+2).

The math unit 124 can determine the memory address for tensor element V2[0][1][1] by determining the sum of the base address and the current address offset values stored in address offset elements $Z_{2,1}$, $Z_{2,2}$, $Z_{2,3}$. In this example, the memory address is the sum of the base address and two. The tensor traversal unit can then output the determined memory address, e.g., to the processing unit 102, the storage medium 104, or to a data bus. The processing unit 102 can then access the tensor element V2[1][0][0] using the determined memory address.

Figure 2J:
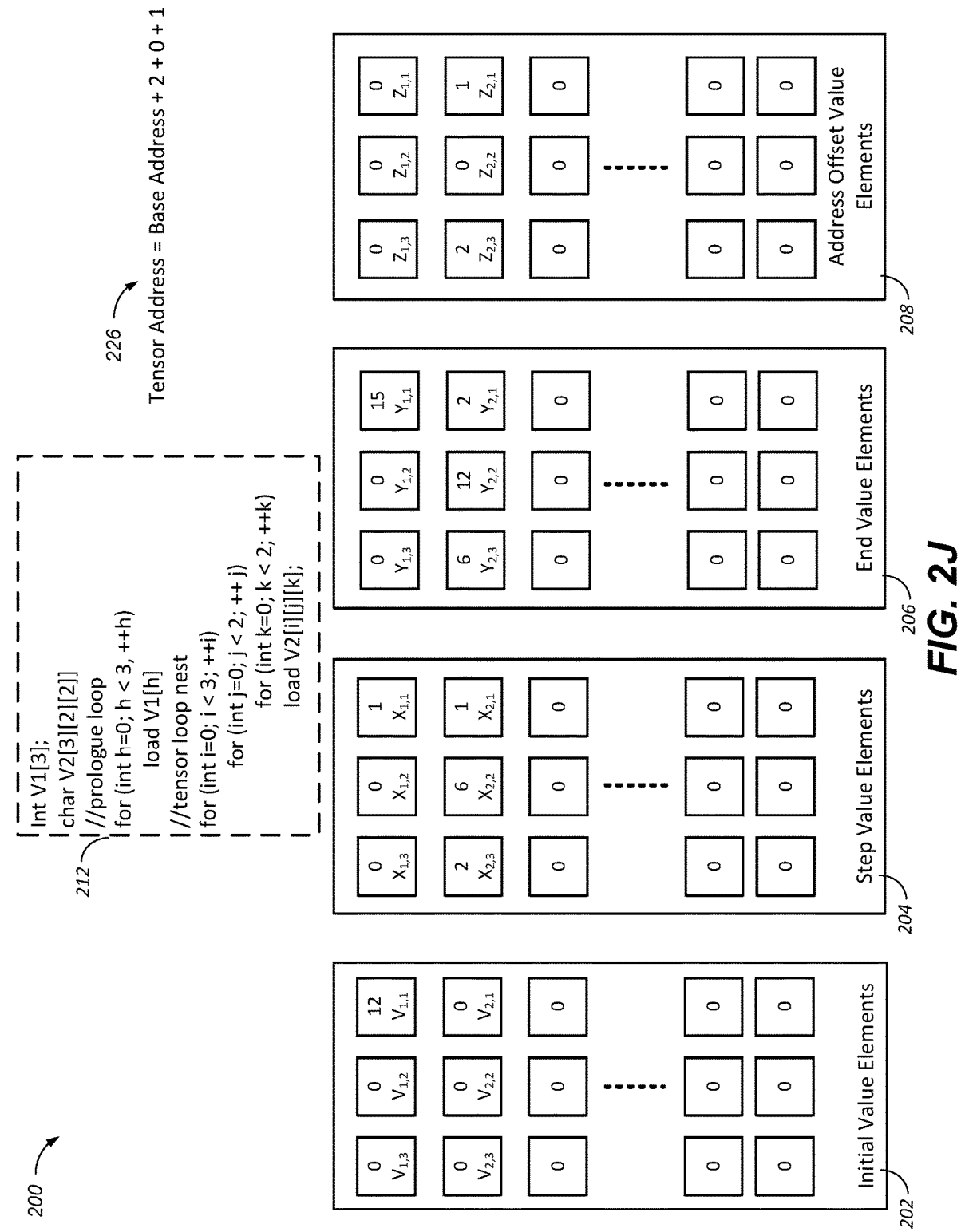

FIG. 2J illustrates accessing the element V2[1][0][1]. After the tensor traversal unit determines the memory address for tensor element V2[1][0][0], the tensor traversal unit can update the address offset value for the tensor by incrementing the address offset value for the dimension represented by the inner loop of the program 212. In this example, the tensor traversal unit can update the address offset values for the tensor by incrementing the address value element $Z_{2,1}$ by its corresponding step value stored in step value element $X_{2,1}$. In this example, the step value (1) is added to the address offset value (0) to get an address offset value of one.

The tensor traversal unit can compare the updated offset address value stored in element $Z_{2,1}$ to the end value for the dimension corresponding to the inner loop stored in element $Y_{2,1}$. Here, the updated offset address value stored in element $Z_{2,1}$ is less than the end value stored in element $Y_{2,1}$. Thus, the tensor traversal unit keeps the updated address value for the dimension corresponding to the inner loop stored in element $Z_{2,1}$.

The math unit 124 can determine the memory address for tensor element V2[1][0][1] by determining the sum of the base address and the current address offset values stored in address offset elements $Z_{2,1}$, $Z_{2,2}$, $Z_{2,3}$. In this example, the memory address is the sum of the base address and three, as shown in equation 226. The tensor traversal unit can then output the determined memory address, e.g., to the processing unit 102, the storage medium 104, or to a data bus. The processing unit 102 can then access the tensor element V2[1][0][1] using the determined memory address.

The tensor traversal unit can continue determining memory addresses for remaining iterations of the nested loops to access the remaining tensor elements in a similar manner. Table 1 below shows the memory address offset values for the prologue elements and the tensor elements using the step values illustrated in FIGS. 2A-2J.

TABLE 1

| Prologue/Tensor Element | Memory Address Offset Value |
| --- | --- |
| V1[0] (h = 0) | 12 |
| V1[1] (h = 1) | 13 |
| V1[2] (h = 2) | 14 |
| V2[0][0][0] (i = 0, j = 0, k = 0) | 0 |
| V2[0][0][1] (i = 0, j = 0, k = 1) | 1 |
| V2[0][1][0] (i = 0, j = 1, k = 0) | 6 |
| V2[0][1][1] (i = 0, j = 1, k = 1) | 7 |
| V2[1][0][0] (i = 1, j = 0, k = 0) | 2 |
| V2[1][0][1] (i = 1, j = 0, k = 1) | 3 |
| V2[1][1][0] (i = 1, j = 1, k = 0) | 8 |
| V2[1][1][1] (i = 1, j = 1, k = 1) | 9 |
| V2[2][0][0] (i = 2, j = 0, k = 0) | 4 |
| V2[2][0][1] (i = 2, j = 0, k = 1) | 5 |
| V2[2][1][0] (i = 2, j = 1, k = 0) | 10 |
| V2[1][1][1] (i = 2, j = 1, k = 1) | 11 |

The example of FIGS. 2B-2J illustrates an implementation in which the program includes a prologue for the loop indexed by loop index variable i. A similar technique can be used for inner loops, such as the loop indexed by loop index variable j.

Figure 3:
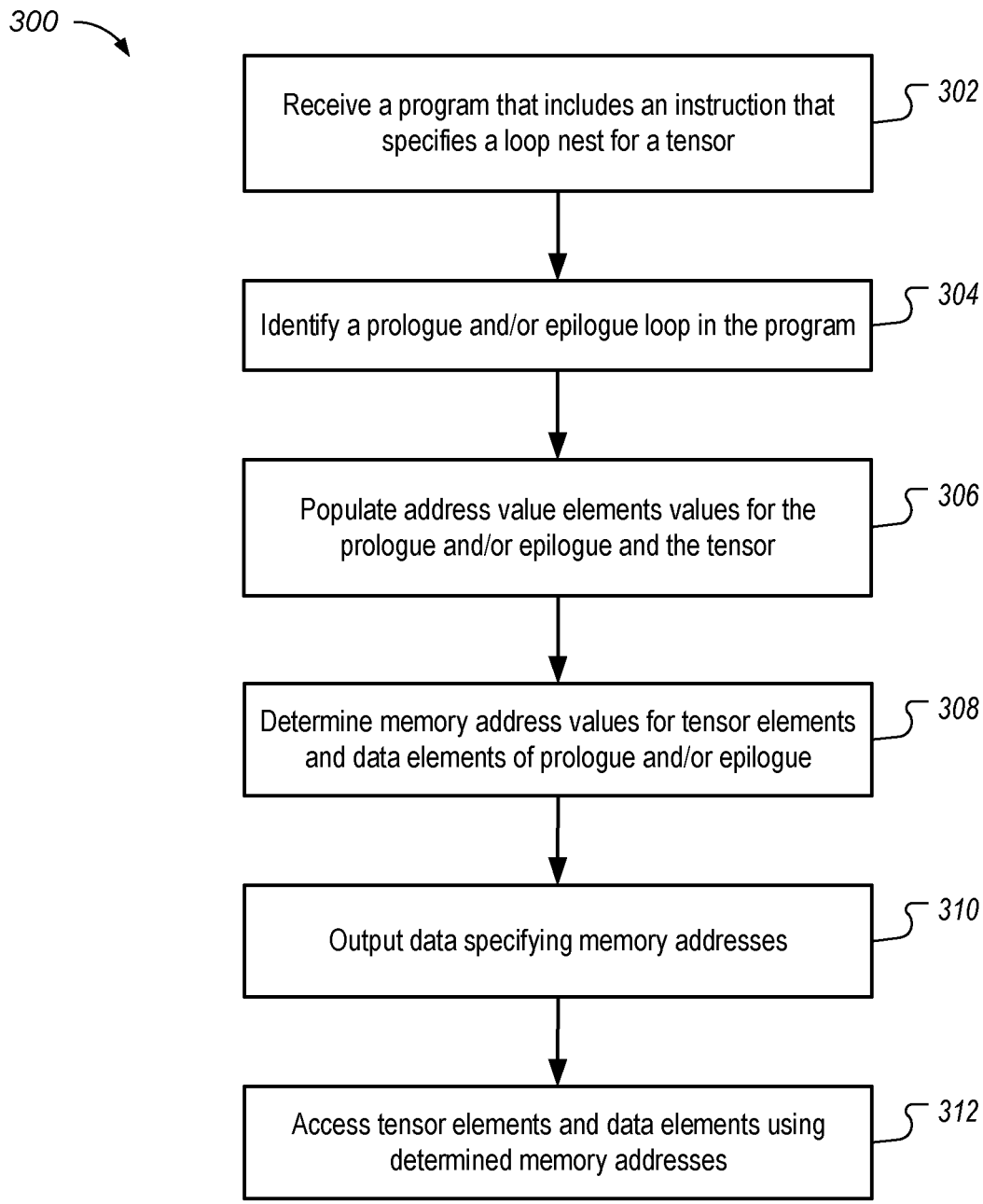
FIG. 3 is a flow diagram that illustrates an example process for determining memory addresses for tensor elements and prologue data elements and/or epilogue data elements.

FIG. 3 is a flow diagram that illustrates an example process 300 for determining memory addresses for tensor elements and prologue data elements and/or epilogue data elements. The process 300 may be performed by a system of one or more computers, e.g., the computing system 100 of FIG. 1. The system includes a tensor traversal unit having tensor address value elements including initial value elements, step value elements, end value elements, and address offset elements. The tensor traversal unit also includes a math unit.

The system receives program that includes an instruction that specifies a main loop nest (302). The instruction can include a loop nest that includes nested loops for traversing an N-dimensional tensor. The N-dimensional tensor can include multiple elements arranged across each of the N dimensions, where N is an integer that is equal to or greater than one.

The system identifies a prologue and/or an epilogue loop in the program (304). For example, the system may identify the main loop nest in the program for traversing the N-dimensional tensor. The system can then determine whether the program includes a prologue loop that is performed prior to the main loop nest of an epilogue loop that is performed after the main loop nest. Each prologue loop and/or epilogue loop can include a corresponding data array for storing values of the prologue loop or epilogue loop.

The system can populate address computation elements based on the instruction (306). For example, the system can determine an initial value, a step value, an end value, and an address offset value for each dimension of the tensor. In addition, the system can determine an initial value, a step value, an end value, and an address offset value for each prologue and each epilogue. The system can determine the initial values, step values and/or end values such that each tensor element and each data element are assigned a unique memory address (or a unique memory address value that is combined with a base address to determine the unique memory address. For example, the tensor traversal unit can determine the step values and the end values for each dimension of the tensor and each data array for the prologues and/or epilogues based on the number of elements included in each dimension and array.

The system can store each initial value in a corresponding initial value element; store each step value in a corresponding step value element; store each end value in a corresponding end value element; and store each address offset value in a corresponding address offset value element. The initial value elements, step value elements, end value elements, and address offset value elements can be arranged based on tensor dimension, prologue data array, and epilogue data array. For example, the elements for a tensor can be arranged in a row with each column corresponding to a dimension of the tensor. Similarly, the elements for a prologue or epilogue can be arranged in a row with each column corresponding to a dimension of the prologue or epilogue.

The system determines memory address values for tensor elements and data elements of prologue and/or epilogue (308). For example, the system can determine the memory addresses in sequence based on loop indices corresponding to each tensor element or data element. The system can use the initial values, step values, and end values to iterate through each tensor element and each data element to determine the memory addresses for the tensor elements and data elements, as described above with reference to FIGS. 2A-2J. The system can determine the memory address for a particular tensor or data element based on the current value of the corresponding address offset values and a base address at the time the memory address is determined.

The system outputs data specifying the determined memory addresses (310). For example, the system may output the data to a processing unit that accesses the tensor elements and the data elements based on the determined memory addresses. In another example, the system may output the determine memory addresses to a storage medium or a data bus so that the processing unit can access the memory addresses.

The system accesses tensor elements and data elements using determined memory addresses (312). For example, a processing unit may access the tensor and data elements to perform machine learning computations.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An apparatus for increasing a speed at which a processing unit performs machine learning computations, the apparatus comprising:

a plurality of address offset value elements that each comprise hardware storage circuitry configured to store an address offset value;

for each address offset value element, a plurality of address computation elements that each comprise hardware storage circuitry configured to store a value used to determine the address offset value stored in the address offset value element;

one or more hardware processors configured to:
populate, for a first address offset value element that corresponds to a prologue or epilogue loop of a program for performing computations using tensor elements of an N-dimensional tensor, the address computation elements for the first address offset value element with respective values based at least on a number of data elements included in a data array for the prologue or epilogue loop, the address computation elements for the first address offset elements including a first step value for the prologue or epilogue loop;

populate, for a second address offset value element for each dimension of the N-dimensional tensor, the address computation elements for the second address offset value element with respective values based at least on a number of tensor elements included in the dimension, wherein:
the address computation elements for each dimension of the N-dimensional tensor include a second step value for the dimension; and
the second step value for each dimension and the first step value for the prologue or epilogue loop are determined based on the number of tensor elements included in each dimension of the N-dimensional tensor and the number of data elements included in the data array for the prologue or epilogue loop such that each data element of the prologue or epilogue loop and each tensor element of the N-dimensional tensor is assigned a unique memory address;

determine, for each data element of the data array, a memory address for the data element using a current value of a first address offset value for the data array at a time at which the memory address for the data element is determined, wherein the first address offset value for the data array is adjusted using the first step value for the prologue or epilogue loop after each determination of a memory address for a data element of the data array;

determine, for each tensor element of the N-dimensional tensor, a memory address for the tensor element using a current value of each second address offset value at a time at which the memory address for the tensor element is determined, wherein the second address offset value for each of one or more of the dimensions of the N-dimensional tensor is adjusted using the second step value for the dimension after each determination of a memory address for a tensor element of the N-dimensional tensor; and output, to the processing unit that performs the machine learning computations, data indicating the determined memory address for each tensor element and each data element.

2. The apparatus of claim 1, wherein the one or more hardware processors are configured to:
receive the program for performing computations using tensor elements of an N-dimensional tensor; and
identify, in the program, the prologue or epilogue loop having the data array for the prologue or epilogue loop.

3. The apparatus of claim 1, further comprising the processing unit, wherein the processing unit is configured to:
access each tensor element and each data element based on each determined address; and
perform the machine learning computations using data of each data element and data of each tensor element.

4. The apparatus of claim 1, wherein the data array includes a prologue data array that includes data elements, each data element storing a bias value for a machine learning computation.

5. The apparatus of claim 1, wherein the one or more hardware processors are configured to determine the memory address for each tensor element in a first sequence and the one or more hardware processors are configured to determine the memory address for each data element in a second sequence either before or after the first sequence.

6. The apparatus of claim 1, wherein determining the memory address for a particular tensor element comprises determining a sum of the second address offset values for each dimension using one or more hardware adders of the one or more hardware processors.

7. The apparatus of claim 1, wherein determining the memory address for a particular data element comprises determining a sum of the first address offset value for the particular data element and a base address for the data element using one or more hardware adders of the one or more hardware processors.

8. The apparatus of claim 1, wherein:
the address computation elements comprise:
a first initial value element configured to store a first initial value for the prologue or epilogue loop;
a first step value element configured to store the first step value for the prologue or epilogue loop; and
for each dimension of the N-dimensional tensor:
a second initial value element configured to store a second initial value for the dimension; and
a second step value element configured to store the second step value for the dimension.

9. The apparatus of claim 8, wherein the one or more hardware processors are configured to initialize each first initial value, each first step value, each second initial value, and each second step value based on a single instruction that specifies a loop for each data array and a loop nest for the N-dimensional tensor.

10. The apparatus of claim 8, wherein the one or more processors are further configured to:
determine, for each dimension, the second address offset value for the dimension after each iteration of a loop for traversing the dimension by adding the second step value for the dimension to a previous second address offset value for the dimension.

11. A method for increasing a speed at which a processing unit performs machine learning computations, the method comprising:
populating, by one or more hardware processors and for a first address offset value element that corresponds to a prologue or epilogue loop of a program for performing computations using tensor elements of an N-dimensional tensor, a plurality of first address computation elements for the first address offset value element with respective values based at least on a number of data elements included in a data array for the prologue or epilogue loop, wherein the first address offset value element comprises hardware storage circuitry configured to store a first address offset value for the data array and each first address computation element comprises hardware storage circuitry configured to store a value used to determine the first address offset value, and wherein the address computation elements for the first address offset elements including a first step value for the prologue or epilogue loop;
populating, by the one or more hardware processors and for a second address offset value element for each respective dimension of the N-dimensional tensor, a plurality of second address computation elements for the second address offset value element with respective values based at least on a number of tensor elements included in the dimension, wherein:
each second address offset element comprises hardware storage circuitry configured to store a second address offset value for the respective dimension and each second address computation element for the second address offset value comprises hardware storage circuitry configured to store a value used to determine the second address offset value;
the address computation elements for each dimension of the N-dimensional tensor include a second step value for the dimension; and
the second step value for each dimension and the first step value for the prologue or epilogue loop are determined based on the number of tensor elements included in each dimension of the N-dimensional tensor and the number of data elements included in the data array for the prologue or epilogue loop such that each data element of the prologue or epilogue loop and each tensor element of the N-dimensional tensor is assigned a unique memory address;
determining, by the one or more hardware processors and for each data element of the data array, a memory address for the data element using a current value of the first address offset value for the data array at a time at which the memory address for the data element is determined, wherein the first address offset value for the data array is adjusted using the first step value for the prologue or epilogue loop after each determination of a memory address for a data element of the data array;
determining, by the one or more hardware processors and for each tensor element of the N-dimensional tensor, a memory address for the tensor element using a current value of each second address offset value at a time at which the memory address for the tensor element is determined, wherein the second address offset value for each of one or more of the dimensions of the N-dimensional tensor is adjusted using the second step value for the dimension after each determination of a memory address for a tensor element of the N-dimensional tensor; and outputting, by the one or more hardware processors and to the processing unit that performs the machine learning computations, data indicating the determined memory address for each tensor element and each data element.

12. The method of claim 11, further comprising:
receiving the program for performing computations using tensor elements of an N-dimensional tensor; and
identifying, in the program, the prologue or epilogue loop having the data array for the prologue or epilogue loop.

13. The method of claim 11, further comprising:
accessing each tensor element and each data element based on each determined address; and
performing machine learning computations using data of each tensor element.

14. The method of claim 13, wherein the data array includes a prologue data array that includes prologue data elements, each prologue data element storing a bias value for a machine learning computation.

15. The method of claim 11, wherein determining the address of a particular tensor element comprises determining a sum of the address offset values for each dimension using one or more hardware adders.

16. The method of claim 11, wherein determining the memory address of a particular data element comprises determining a sum of the address offset value for the particular data element and a base address for the data element.

17. The method of claim 11, wherein:
the address computation elements comprise:
a first initial value element configured to store a first initial value for the prologue or epilogue loop;
a first step value element configured to store the first step value for the prologue or epilogue loop; and
for each dimension of the N-dimensional tensor:
a second initial value element configured to store a second initial value for the dimension; and
a second step value element configured to store the second step value for the dimension.

18. The method of claim 17, wherein each address offset value element, each initial value element, and each step value element comprises a register.

19. The method of claim 17, further comprising initializing each first initial value, each first step value, each second initial value, and each second step value based on a single instruction that specifies a loop for each data array and a nested loop for the N-dimensional tensor.

20. A system for increasing a speed at which a processing unit performs machine learning computations, comprising:
a plurality of address offset value elements that each comprise hardware storage circuitry configured to store an address offset value;
for each address offset value element, a plurality of address computation elements that each comprise hardware storage circuitry configured to store a value used to determine the address offset value stored in the address offset value element;

hardware circuitry that includes one or more hardware adders and is configured to:
populate, for a first address offset value element that corresponds to a prologue or epilogue loop of a program for performing computations using tensor elements of an N-dimensional tensor, the address computation elements for the first address offset value element with respective values based at least on a number of data elements included in a data array for the prologue or epilogue loop, the address computation elements for the first address offset elements including a first step value for the prologue or epilogue loop;

populate, for a second address offset value element for each dimension of the N-dimensional tensor, the address computation elements for the second address offset value element with respective values based at least on a number of tensor elements included in the dimension, the address computation elements for each dimension of the N-dimensional tensor including a second step value for the dimension, wherein the second step value for each dimension and the first step value for the prologue or epilogue loop are determined based on the number of tensor elements included in each dimension of the N-dimensional tensor and the number of data elements included in the data array for the prologue or epilogue loop such that each data element of the prologue or epilogue loop and each tensor element of the N-dimensional tensor is assigned a unique memory address;

determine, for each data element of each data array, a memory address for the data array using a current value of a first address offset value for the data array at a time at which the memory address for the data element is determined, wherein the first address offset value for the data array is adjusted using the first step value for the prologue or epilogue loop after each determination of a memory address for a data element of the data array;

determine, for each tensor element of the N-dimensional tensor, a memory address for the tensor element using a current value of each second address offset value at a time at which the memory address for the tensor element is determined, wherein the second address offset value for each of one or more of the dimensions of the N-dimensional tensor is adjusted using the second step value for the dimension after each determination of a memory address for a tensor element of the N-dimensional tensor; and output, to the processing unit that performs the machine learning computations, data indicating the determined memory address for each tensor element and each data element.

* * * * *